United States Patent
Yang et al.

(10) Patent No.: US 11,308,856 B2
(45) Date of Patent: Apr. 19, 2022

(54) MODULAR DISPLAY APPARATUS AND METHOD FOR MAINTAINING DISPLAY PERFORMANCE

(71) Applicant: SAMSUNG ELECTRONICS CO., LTD., Suwon-si (KR)

(72) Inventors: Kwansik Yang, Suwon-si (KR); Jaehong Kim, Suwon-si (KR); Sangkyung Lee, Suwon-si (KR); Byeongcheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/046,160

(22) PCT Filed: Apr. 11, 2019

(86) PCT No.: PCT/KR2019/004378
§ 371 (c)(1),
(2) Date: Oct. 8, 2020

(87) PCT Pub. No.: WO2019/203499
PCT Pub. Date: Oct. 24, 2019

(65) Prior Publication Data
US 2021/0174754 A1    Jun. 10, 2021

(30) Foreign Application Priority Data

Apr. 17, 2018    (KR) ........................ 10-2018-0044636

(51) Int. Cl.
*G09G 3/20*    (2006.01)
*G06F 3/14*    (2006.01)

(52) U.S. Cl.
CPC ......... *G09G 3/2092* (2013.01); *G06F 3/1446* (2013.01); *G09G 2300/026* (2013.01);
(Continued)

(58) Field of Classification Search
CPC ................ G06F 3/1446; G09G 3/2092; G09G 2300/026; G09G 2320/0233;
(Continued)

(56) References Cited

U.S. PATENT DOCUMENTS

| | | | |
|---|---|---|---|
| 6,219,011 B1 * | 4/2001 | Aloni | H04N 9/3147 345/1.3 |
| 6,292,157 B1 * | 9/2001 | Greene | G09G 3/2003 345/1.3 |

(Continued)

FOREIGN PATENT DOCUMENTS

| | | |
|---|---|---|
| JP | 2004-029332 | 1/2004 |
| JP | 2004-070699 | 3/2004 |

(Continued)

OTHER PUBLICATIONS

International Search Report (with translation) for PCT/KR2019/004378, dated Jul. 17, 2019, 4 pages.

(Continued)

*Primary Examiner* — Gene W Lee
(74) *Attorney, Agent, or Firm* — Nixon & Vanderhye, P.C.

(57) ABSTRACT

An electronic device is disclosed. The disclosed electronic device comprises a display including a first display module and a second display module, a processor, and a memory, wherein the memory may store instructions that cause the processor to store first data obtained from the first display module and second display data obtained from the second display module, accumulate the first data over a predetermined period to obtain an average value of the first data, accumulate the second data over a predetermined period to obtain an average value of the second data, and control the display to display guide information requesting the positions of the first display module and the second display module to change using the average value of the first data and the (Continued)

average value of the second data. In addition, at least a portion of the electronic device may use a rule-based model or an artificial intelligence data recognition model trained according to at least one of a machine learning, a neural network, or a deep learning algorithm. The rule-based model or the artificial intelligence data recognition model may estimate whether to replace the display module by using, as input values, the first data generated by the first display module and the second data generated by the second display module.

15 Claims, 14 Drawing Sheets

(52) U.S. Cl.
CPC ............... *G09G 2320/0233* (2013.01); *G09G 2320/043* (2013.01); *G09G 2320/0693* (2013.01); *G09G 2354/00* (2013.01); *G09G 2360/16* (2013.01)

(58) Field of Classification Search
CPC ........ G09G 2320/043–046; G09G 2320/0693; G09G 2354/00; G09G 2360/16
See application file for complete search history.

(56) References Cited

U.S. PATENT DOCUMENTS

| | | | | |
|---|---|---|---|---|
| 8,405,686 B2* | 3/2013 | Tanizoe | ............... | G09G 3/2007 345/690 |
| 9,229,678 B2* | 1/2016 | Kitajima | ............... | G06F 3/1446 |
| 9,368,072 B2* | 6/2016 | Otoi | ..................... | G09G 3/3426 |
| 10,268,439 B2 | 4/2019 | Sakai et al. | | |
| 10,957,244 B2* | 3/2021 | Sawada | ..................... | G09F 9/33 |
| 2004/0252228 A1 | 12/2004 | Waki et al. | | |
| 2012/0133290 A1 | 5/2012 | Hasegawa | | |
| 2014/0340437 A1 | 11/2014 | Kohashikawa | | |
| 2015/0254046 A1 | 9/2015 | Hall | | |
| 2016/0127144 A1 | 5/2016 | Takahashi et al. | | |
| 2017/0010845 A1* | 1/2017 | Noguchi | ............... | G06F 3/1446 |

FOREIGN PATENT DOCUMENTS

| | | |
|---|---|---|
| JP | 2004-309562 | 11/2004 |
| JP | 2012-113152 | 6/2012 |
| JP | 2012-244504 | 12/2012 |
| JP | 2015-106194 | 6/2015 |
| JP | 2017-085724 | 5/2017 |
| KR | 10-1149059 | 5/2012 |
| KR | 10-2014-0085944 | 7/2014 |
| KR | 10-1654082 | 9/2016 |
| KR | 10-2017-0114862 | 10/2017 |

OTHER PUBLICATIONS

Written Opinion of the ISA (with translation) for PCT/KR2019/ 004378, dated Jul. 17, 2019, 7 pages.
Extended European Search Report dated Mar. 4, 2021 for European Patent Application No. 19789262.3.
Communication pursuant to Article 94(3) EPC dated Mar. 3, 2022 for European Patent Application No. 19789262.3.

* cited by examiner

FIG. 2
(a)
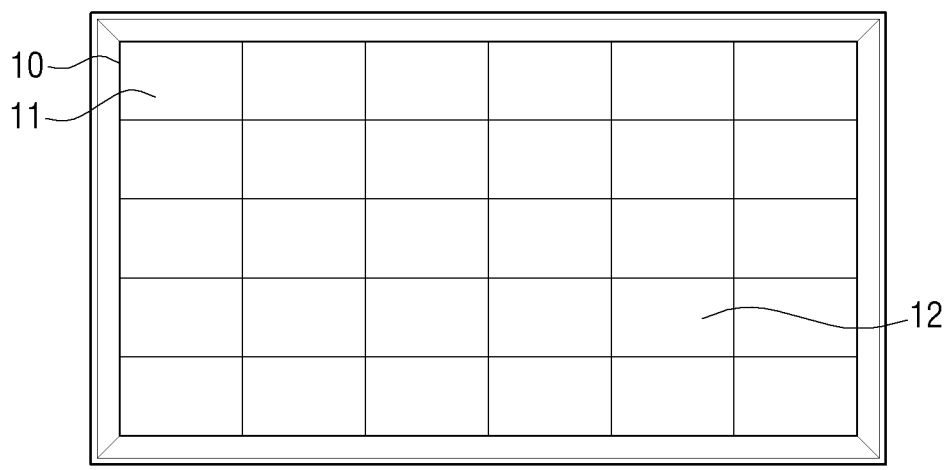
(b)
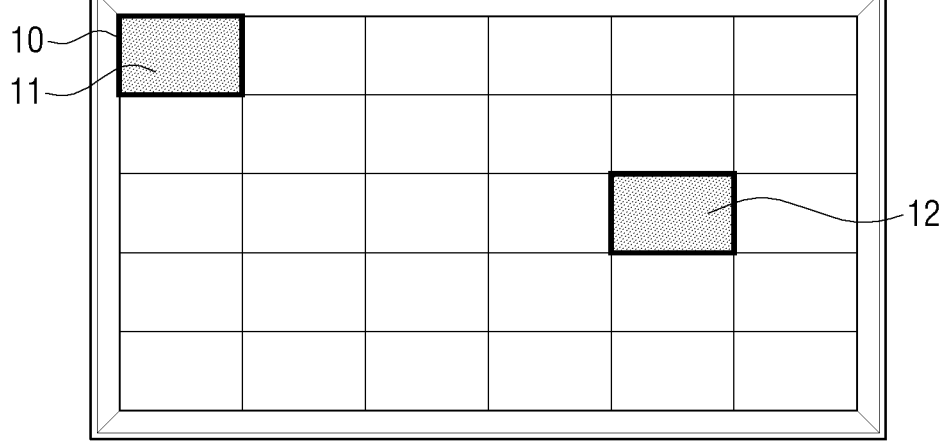

FIG. 3
(a)
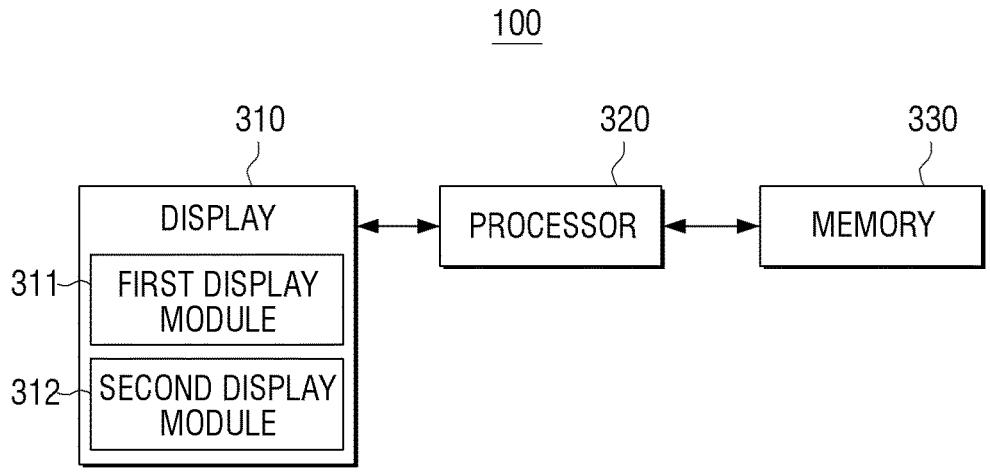
(b)
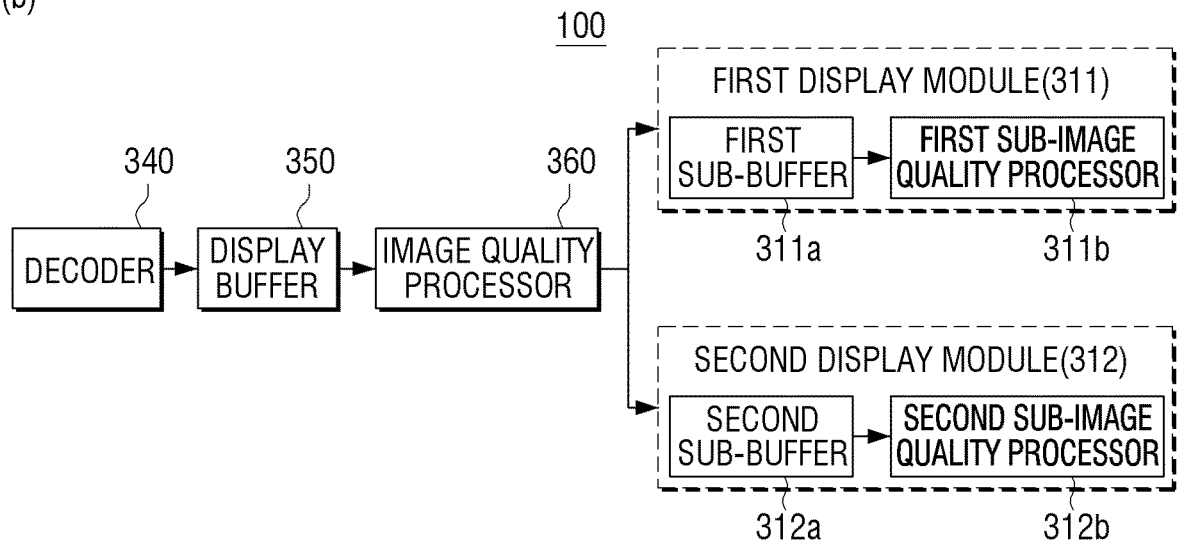
(c)
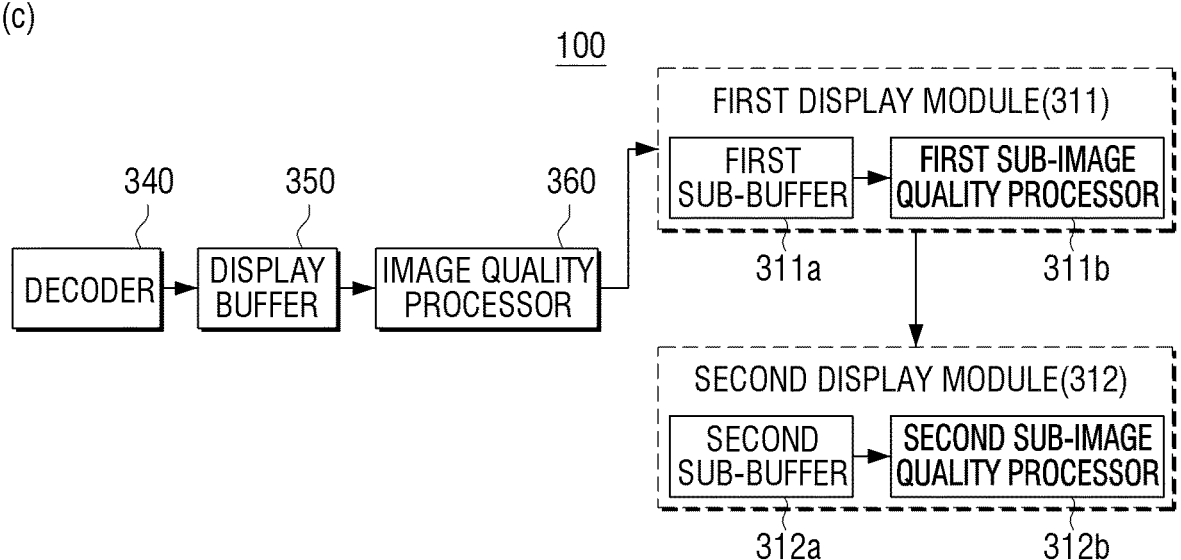

FIG. 4
(a)
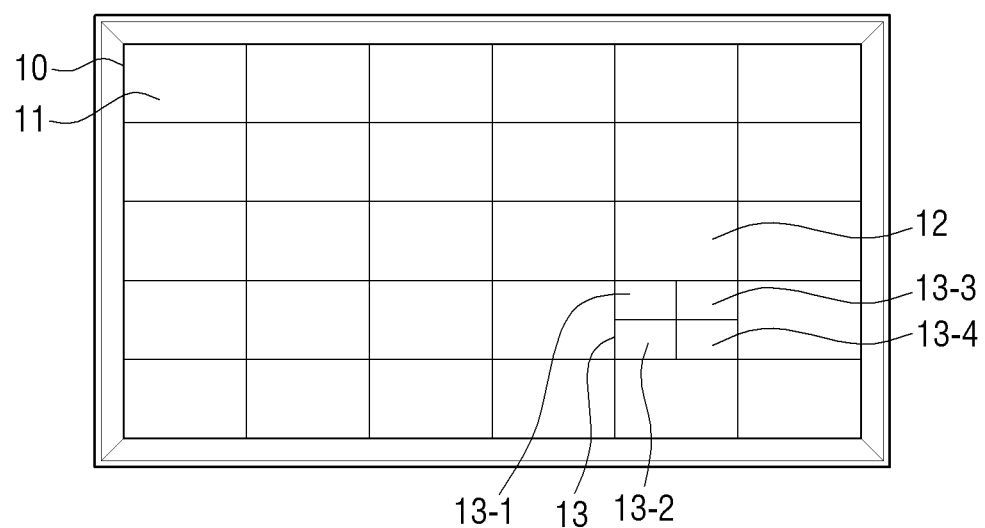
(b)
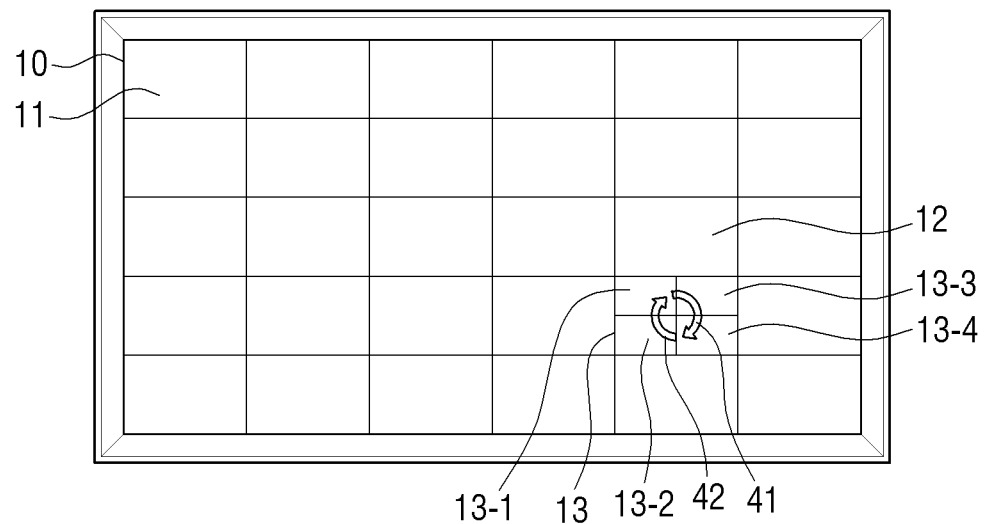

FIG. 6
(a)
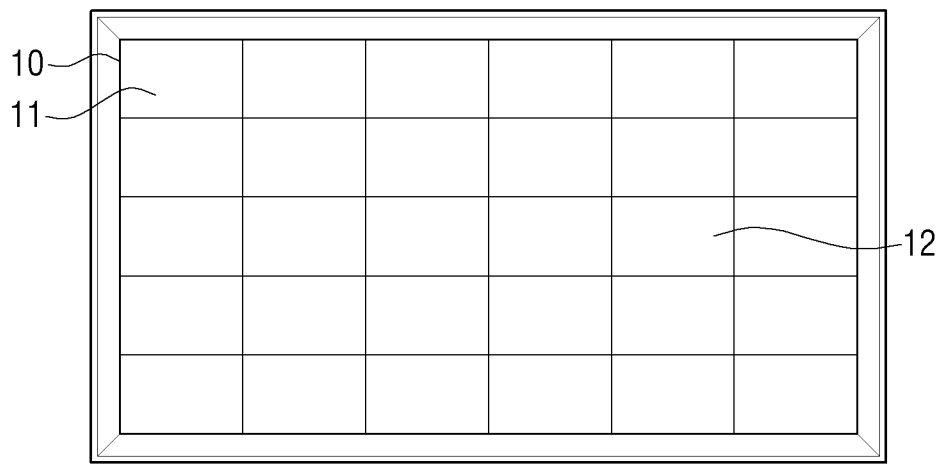
(b)
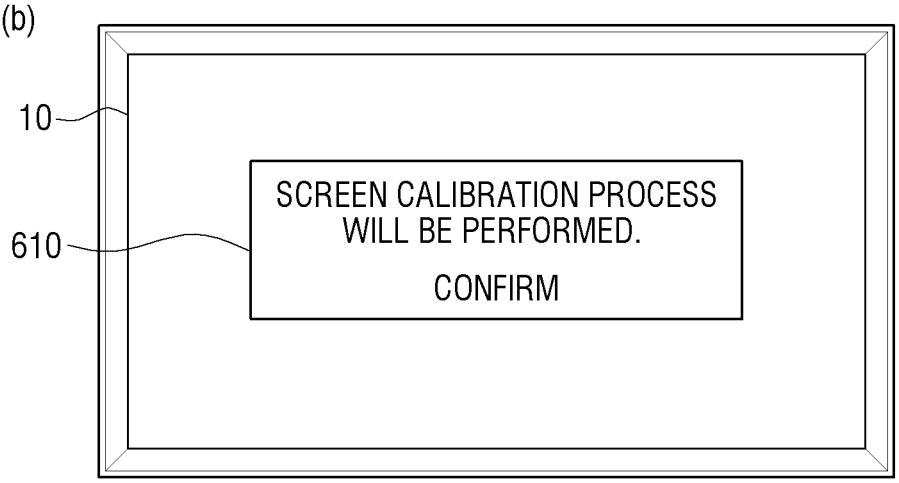

MODULAR DISPLAY APPARATUS AND METHOD FOR MAINTAINING DISPLAY PERFORMANCE

This application is the U.S. national phase of International Application No. PCT/KR2019/004378 filed 11 Apr. 2019, which designated the U.S. and claims priority to KR Patent Application No. 10-2018-0044636 filed 17 Apr. 2018, the entire contents of each of which are hereby incorporated by reference.

TECHNICAL FIELD

The disclosure relates to a method for maintaining performance of a display including a plurality of display modules, in particular, to an electronic device for guiding a change positions of the display modules according to data obtained by each display module and a control method thereof.

DESCRIPTION OF RELATED ART

Generally, in an LED display, a large-sized screen may be realized using a small-sized LED panel.

In the related art, an LED display with a great pitch between LEDs arranged on an LED panel has been used as a large-sized outdoor display device.

However, with an increase in demand for a large-sized high-definition display device, various studies have been made with respect to a display with a small pitch between LEDs arranged on the LED panel.

In addition, with an increase in demand for a supersized display or a large-sized indoor display, various studies have been made with respect to a display that is easy to be moved and installed.

SUMMARY

In accordance with aspects of the disclosure, it is possible to predict a change of performance of a plurality of display modules configuring a display and provide guide information suggesting a change of positions of the plurality of display modules in accordance with the change of performance.

In accordance with aspects of the disclosure, it is possible to provide guide information suggesting the change of positions of the plurality of display modules using luminance information received from the plurality of display modules configuring the display.

In accordance with aspects of the disclosure, it is possible to provide information for adjusting display stetting of the display using the luminance information received from the plurality of display modules configuring the display.

In accordance with an aspect, there is provided an electronic device including a display including a first display module and a second display module, a processor, and a memory, in which the memory stores instructions set for the processor configured to, store first data obtained from the first display module and second data obtained from the second display module, obtain an average value of the first data by accumulating the first data for a set period and obtain an average value of the second data by accumulating the second data for a set period, and control the display to display guide information for requesting for a change of positions of the first display module and the second display module using the average value of the first data and the average value of the second data.

In the electronic device in accordance with the aspect, the first data may be first luminance obtained from the first display module and the second data may be second luminance obtained from the second display module.

In the electronic device in accordance with the aspect, the memory may store instructions set for the electronic device to control the display to display the guide information, based on first average luminance obtained by accumulating the first luminance obtained from the first display module for a set period being different from second average luminance obtained by accumulating the second luminance obtained from the second display module for a set period by a set value or more.

In the electronic device in accordance with the aspect, the guide information may be indicated by displaying a set color on an edge of the first display module and an edge of the second display module.

In the electronic device in accordance with the aspect, the device according may further include a communicator, and the memory may store instructions set for the processor configured to control the communicator to transmit the guide information to an external device.

In the electronic device in accordance with the aspect, the memory may store instructions set for the electronic device to change at least one of a calibration coefficient value of pixels included in the first display module and a calibration coefficient value of pixels included in the second display module using the average value of the first data and the average value of the second data.

In the electronic device in accordance with the aspect, the memory may store instructions set for the electronic device to display the guide information, based on first calibration average luminance obtained using a maximum value of the first luminance and the first average luminance being different from second calibration average luminance obtained using a maximum value of the second luminance and the second average luminance by a set value or more.

In the electronic device in accordance with the aspect, the memory may store instructions causing the processor to obtain third data including whether to change the positions of the display modules by applying first average luminance obtained by accumulating the first luminance for a set period and second average luminance obtained by accumulating the second luminance for a set period to a data recognition model trained using an artificial intelligence algorithm. The data recognition model may be a data recognition model trained using the first average luminance, the second average luminance, and the third data including whether to change the positions of the display modules according to the first average luminance and the second average luminance as learning data, and set to obtain the third data including whether to change the positions of the display modules using the average luminance.

In accordance with another aspect, there is provided an electronic device including a display including a first display module and a second display module, a communicator for communicating with an external device, a processor, and a memory, in which the memory stores instructions set for the processor configured to store first data obtained from the first display module and second data obtained from the second display module, control the communicator to transmit an average value of the first data obtained by accumulating the first data for a set period and an average value of the second data obtained by accumulating the second data for a set period to an external device and receive third data including whether to change positions of the first display module and the second display module obtained by the external device, and display guide information for requesting for a change of positions of the first display module and the second display module using the third data, and the third data is obtained using the average value of the first data and the average value of the second data.

In accordance with still another aspect, there is provided a server including a communicator, a processor, and a memory, in which the memory stores instructions set for the processor configured to receive an average value of first data obtained by using the first data obtained from a first display module and an average value of second data obtained using the second data obtained from a second display module via the communicator, obtain third data including whether to change positions of the first display module and the second display module using the average value of the first data and the average value of the second data, and control the communicator to transmit the third data to an external device.

In accordance with still another aspect, there is provided a method for controlling an electronic device, the method including storing first data obtained from a first display module and second data obtained from a second display module, obtaining an average value of the first data by accumulating the first data for a set period and obtaining an average value of the second data by accumulating the second data for a set period, and displaying guide information for requesting for a change of positions of the first display module and the second display module using the average value of the first data and the average value of the second data.

In the method accordance with the aspect, the first data may be first luminance obtained from the first display module and the second data may be second luminance obtained from the second display module.

The method accordance with the aspect may further include displaying the guide information, based on first average luminance obtained by accumulating the first luminance obtained from the first display module for a set period being different from second average luminance obtained by accumulating the second luminance obtained from the second display module for a set period by a set value or more.

In the method accordance with the aspect, the guide information may be indicated by displaying a set color on an edge of the first display module and an edge of the second display module.

The method accordance with the aspect may further include transmitting the guide information to an external device.

The method accordance with the aspect may further include changing at least one of a calibration coefficient value of pixels included in the first display module and a calibration coefficient value of pixels included in the second display module using the average value of the first data and the average value of the second data.

The method accordance with the aspect may further include displaying the guide information, based on first calibration average luminance obtained using a maximum value of the first luminance and the first average luminance being different from second calibration average luminance obtained using a maximum value of the second luminance and the second average luminance by a set value or more.

The method accordance with the aspect may further include obtaining third data including whether to change the positions of the display modules by applying first average luminance obtained by accumulating the first luminance for a set period and second average luminance obtained by accumulating the second luminance for a set period to a data recognition model trained using an artificial intelligence algorithm, and the data recognition model is a data recognition model trained using the first average luminance, the second average luminance, and the third data including whether to change the positions of the display modules according to the first average luminance and the second average luminance as learning data, and set to obtain the third data including whether to change the positions of the display modules using the average luminance.

The method accordance with the aspect may further include receiving an average value of first data obtained by using the first data obtained from a first display module and an average value of second data obtained using the second data obtained from a second display module, and obtaining third data including whether to change positions of the first display module and the second display module using the average value of the first data and the average value of the second data, and transmitting the third data to an external device.

In accordance with still another aspect, there is provided a computer-readable recording medium storing instructions for enabling a computer to execute storing first data obtained from the first display module and second data obtained from the second display module, obtaining an average value of the first data by accumulating the first data for a set period and obtaining an average value of the second data by accumulating the second data for a set period, and displaying guide information for requesting for a change of positions of the first display module and the second display module using the average value of the first data and the average value of the second data.

In accordance with one aspect of the disclosure, it is possible to maintain performance of the electronic device, since the electronic device continuously provides excellent image quality by changing positions of the display modules included in the display.

In accordance with another aspect of the disclosure, it is possible to maintain excellent image quality providing performance of the electronic device by automatically changing display setting of the display using data generated in the electronic device, without a separate image quality measurement device.

BRIEF DESCRIPTION OF THE DRAWINGS

FIG. 2 illustrates views for explaining situations in which the electronic device displays guide information for requesting for a change of positions of display modules using data generated by each display module according to an embodiment.

FIG. 3 illustrates block diagrams illustrating schematic configurations of the electronic device according to an embodiment.

FIG. 4 illustrates views for explaining situations in which the electronic device displays guide information for requesting for a change of positions of display areas using data generated by the display module according to an embodiment.

FIG. 6 illustrates views for explaining situations in which the electronic device displays guide information related to display calibration using data generated by each display module according to an embodiment.

DETAILED DESCRIPTION OF EXAMPLE EMBODIMENTS

Figure 1:
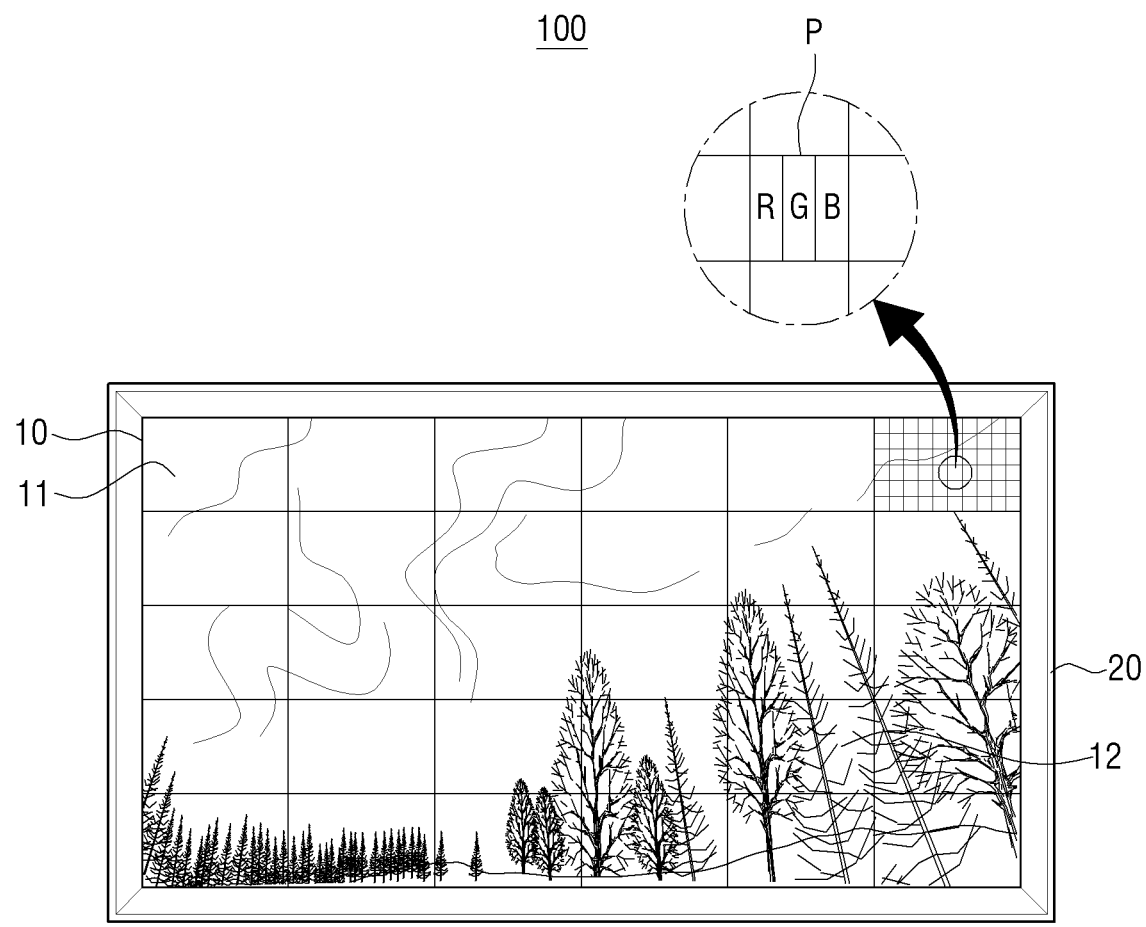
FIG. 1 illustrates a front view of an electronic device according to an embodiment.

Hereinafter, with reference to the accompanying drawings, embodiments of the disclosure will be described in detail so that those skilled in the art can easily make and use the embodiments in the technical field of the disclosure. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

The terms used in disclosure have been selected as currently used general terms as possible in consideration of functions in the disclosure, but these may vary in accordance with the intention of those skilled in the art, the precedent, the emergence of new technologies and the like. Therefore, the terms used in the disclosure should be defined based on the meanings of the terms themselves and the contents throughout the disclosure, rather than the simple names of the terms.

In addition, the terms used in the disclosure are only used to describe specific embodiments and are not used to limit the disclosure. Unless otherwise defined specifically, a singular expression may encompass a plural expression. In the specification, the expression that a certain component is "connected" to another component not only includes a case where the components are "directly connected to each other", but also a case where the components are "connected to each other with another component interposed therebetween". In addition, the expression that a certain component "includes" another component does not mean that other components are excluded, but means that the other components may be further included, unless otherwise noted.

In the specification, particularly, "the" and similar demonstratives used in the claims may indicate both singular and plural terms. In addition, if the order of steps describing a method according to the disclosure is not clearly designated, the steps may be performed in a suitable order. The disclosure is not limited by the described order of the steps.

The expression "in some embodiments" or "in an embodiment" in many parts of the specification does not necessarily indicate the same embodiment.

The embodiments of the disclosure may be described with functional block configurations and various processing steps. Some or all of such functional blocks may be implemented as various numbers of hardware and/or software configurations executing specific functions. For example, the functional blocks of the disclosure may be implemented by one or more microprocessors or may be implemented by a circuitry for a predetermined function. In addition, for example, the functional blocks of the disclosure may be implemented with various programming or scripting languages. The functional blocks may be implemented as algorithms executed by one or more processors. In addition, in the disclosure, technologies of the related art may be used for electronic environment setting, signal processing and/or data processing. The terms "mechanism", "element", "means", "configuration", and the like may be used in broad sense and are not limited as mechanical and physical components.

In addition, connection wires or connection members between elements illustrated in the drawings are merely illustrating functional connection and/or physical or circuit connections. In an actual device, the connection between the components may be realized by various functional connections, physical connections, or circuit connections which may be replaced or added.

Hereinafter, the disclosure will be described in detail with reference to the accompanying drawings.

FIG. 1 illustrates a front view of an electronic device according to an embodiment.

Referring to FIG. 1, an electronic device 100 may be an image display device (e.g., television (TV)) for processing an image signal received from outside and visually displaying the processed image, but is not limited thereto, and may be implemented as a device including a memory and a processor. For example, the electronic device 100 may be implemented as various image display devices such as a mobile phone, a tablet PC, a digital camera, a camcorder, a laptop computer, a tablet PC, a desktop PC, an electronic book terminal, a terminal for digital broadcasting, a personal digital assistant (PDA), a portable multimedia player (PMP), a navigation system, an MP3 player, or a wearable device. In addition, the electronic device 100 may be fixed or movable type and may be a digital broadcasting receiver for digital broadcasting receiving.

In addition, the electronic device 100 according to an embodiment may be implemented as a device including a display. The electronic device 100 may be implemented as a curved display device having a screen having curvature or a flexible display device having adjustable curvature, in addition to a flat display device. An output resolution of the electronic device 100 may be, for example, high definition (HD), Full HD, Ultra HD, or a resolution with higher definition than Ultra HD.

A display 10 of the electronic device 100 may include a plurality of display modules. For example, the display 10 may include a first display module 11 and a second display module 12. The plurality of display modules including the first display module 11 and the second display module 12 may be combined with a support 20 to be able to be separated. A combination structure of the display modules included in the electronic device 100 will be described below with reference to FIGS. 11 to 13.

The plurality of display modules may be formed of a plurality of pixels P and an image displayed on the display 10 may be formed by light emitted by the plurality of pixels.

The pixel P herein may refer to a point which is a minimum unit configuring the image. Accordingly, the display may be formed of an assembly of pixels. The plurality of pixels may emit light with different brightness and different colors.

For example, one pixel in a screen such as a light emitting diode (LED) display may be formed of three sub-pixels.

The sub-pixel may be formed of a red pixel R, a green pixel G, and a blue pixel G, which are pixels with the three primary colors of light. In other words, the one pixel P may express all colors through the three primary colors of light which are R (red), G (green), and B (blue).

In other words, the electronic device 100 may selectively or sequentially output red, green, blue light from one pixel P. Accordingly, one image may be expressed on the display 10 to human eyes by combining light beams output from the one pixel P.

The red pixel R may emit red light with various brightness, the green pixel G may emit green light with various brightness, and the blue pixel B may emit blue light with various brightness. The red light may refer to light having a wavelength in a range of approximately 620 nanometers (nm, 1/1,000,000,000 meters) to 750 nm, the green light may refer to light having a wavelength in a range of approximately 495 nm to 570 nm, and the blue light may refer to light having a wavelength in a range of approximately 450 nm to 495 nm.

Therefore, for example, the electronic device 100 may control each pixel P to output the green light having a wavelength selected from the range of 495 nm to 570 nm.

FIG. 2 illustrates views for explaining situations in which the electronic device displays guide information for requesting for a change of positions of the display modules using data generated by each display module according to an embodiment.

Referring to (a) of FIG. 2, the display 10 may include a plurality of display modules. For example, the display 10 may be formed by including 30 display modules including the first display module 11 and the second display module 12.

As described above with reference to FIG. 1, the plurality of display modules may be formed of the plurality of pixels and an image displayed on the display 10 may be formed with light emitted by the plurality of pixels. If the display 10 according to the embodiments is an LED display, one pixel may include the red sub-pixel, the green sub-pixel, and the blue sub-pixel. In other words, the display 10 may display an image by combining light output from one pixel including the red sub-pixel, the green sub-pixel, and the blue sub-pixel.

According to an embodiment, the electronic device 100 may obtain various types of data from the plurality of display modules. The electronic device 100 may obtain first data from the first display module 11 and obtain second data from the second display module 12.

According to an embodiment, when the pixels included in each of the display modules including the first display module 11 and the second display module 12 display an image by outputting light, the electronic device 100 may obtain information regarding luminance which is brightness of light output by the pixels (e.g., luminance information). For example, the electronic device 100 may obtain first luminance (e.g., first data) from the first display module 11 and obtain second luminance (e.g., second data) from the second display module 12.

According to an embodiment, the luminance information of the display module may refer to an average value of luminance output by the pixels configuring the display module.

According to the embodiments, the luminance may include time for light emission of the LED pixel and a current value input to the LED pixel. For example, the luminance of the LED pixel may increase, if the light emission time of the LED pixel increases or the current value of the LED pixel increases. For example, the luminance of the LED pixel may decrease, if the light emission time of the LED pixel decreases or the current value of the LED pixel decreases.

The electronic device 100 according to an embodiment may accumulate the luminance obtained from the display modules for a set period (e.g., 3 months, 6 months, 1 year, 2 years, or the like). The electronic device 100 may obtain an average value of the luminance (e.g., average luminance) using the accumulated luminance obtained from each display module.

For example, referring to (a) of FIG. 2, the electronic device 100 may obtain and store luminance information (e.g., first luminance) from the first display module 11. The electronic device 100 may identify that first average luminance of the first display module 11 is 200 nits (nt) using the first luminance accumulated for a set period. In addition, the electronic device 100 may obtain and store luminance information (e.g., second luminance) from the second display module 12. The electronic device 100 may identify that second average luminance of the second display module 12 is 400 nits (nt) using the second luminance accumulated for a set period.

The electronic device 100 may identify that the pixels included in the second display module 12 have output light with luminance higher than that of the pixels included in the first display module 11 by comparing the first average luminance and the second average luminance.

The output of light with high luminance by the LED pixels may imply, for example, that the electronic device 100 has applied a high current value to the LED pixel or increased light emission time. If the LED pixels output light with high luminance, the light emission life for outputting light may be reduced compared to the pixels outputting light with low luminance.

According to an embodiment, the electronic device 100 may guide a user to change positions of the display modules in order to prevent comparatively rapid decrease in life of some display modules among the plurality of display modules.

Referring to (b) of FIG. 2, the electronic device 100 may display guide information for requesting for a change of the position of each display module on the display 10 using data obtained by each display module.

According to an embodiment, the electronic device 100 may display the guide information for requesting for a change of positions of the two display modules 11 and 12 with each other, on the display 10, if the first average luminance obtained using the data obtained by the first display module 11 is different from the second average luminance obtained using the data obtained by the second display module 12 by a set value or more (e.g., twice or more). But, a reference for displaying the guide information for requesting for the change of the positions of the two display modules is not limited thereto. For example, the electronic device 100 may generate the guide information for requesting for the change of the positions of the two display modules 11 and 12 and display the guide information on the display 10, if the first average luminance obtained using the data obtained by the first display module 11 is different from the second average luminance obtained using the data obtained by the second display module 12 by 1.2 times, 1.5 times, or 1.8 times.

According to an embodiment, the electronic device 100 may display an edge of the first display module 11 and an edge of the second display module 12 to be changed, with a set color (e.g., red, orange, or the like), as the guide information. In this case, the electronic device 100 may display the first display module 11 and the second display module 12 to be changed in a translucent state. According to the embodiments, the electronic device 100 may display a notification message of "Please change positions of two display modules" on the display 10 as a pop-up window.

According to the embodiments, the electronic device 100 may display the edge of the first display module 11 and the edge of the second display module 12 to be changed, with increased brightness as the guide information.

According to the embodiments, the electronic device 100 may display a first arrow towards a direction from the first display module 11 to the second display module 12 and a second arrow towards a direction from the second display module 12 to the first display module 11 as the guide information, to display the guide information for requesting for the change of the positions of the two display modules 11 and 12 with each other.

According to the embodiments, the electronic device 100 may store unique number corresponding to each display module. The electronic device 100 may match each unique number to the display module, display the unique numbers on the display, and then display a notification message of "Please change positions of No. 1 (e.g., first display module) and No. 17 (e.g., second display module)" as a pop-up window as the guide information.

According to the embodiments, if the electronic device 100 is able to communicate with a wearable device or another electronic device, the electronic device 100 may transmit the guide information to the wearable device or the other electronic device to provide the guide information to a user.

However, the method for displaying the guide information for requesting for the change of the positions of the display modules may not be limited thereto. The electronic device 100 may provide the guide information to the user using various methods.

According to the embodiments, the electronic device 100 may use the highest brightness value among the luminance obtained by the display modules. For example, the electronic device 100 may generate a function for applying the highest brightness value among the luminance obtained by the display modules to the average luminance.

According to the embodiments, the highest brightness value and the first average luminance among the first luminance may be input to the function and the two values may be calculated to obtain first calibration average luminance. In addition, the highest brightness value and the second average luminance among the second luminance may be input to the function and the two values may be calculated to obtain second calibration average luminance. The electronic device 100 may generate and display the guide information, if the first calibration average luminance is different from the second calibration average luminance by a set value or more. However, there is no limitation thereto, and the electronic device 100 may display the guide information using the luminance obtained by the display modules by various methods, the luminance with the highest brightness, the average luminance, and the like.

According to the embodiments, the electronic device 100 may identify a display module which is necessary to be changed using a position of the electronic device and a sensing value of an illuminance sensor positioned at a front part of the electronic device 100.

According to an embodiment, the electronic device 100 may divide an area exposed to external light (e.g., light of the sun or the like) for a comparatively longer period and an area exposed for a comparatively shorter period on the display using at least one or more illuminance sensor. In addition, information regarding an intensity of the external light may be ensured. The life of the pixels positioned in the area exposed to the external light for a longer period may be reduced to be shorter than the life of the pixels positioned in the area exposed to the external light for a shorter period. In addition, the life of the pixel exposed to the external light at a comparatively higher intensity may be shorter than the life of the pixel exposed to the external light at a comparatively lower intensity. The electronic device 100 may identify a performance change of each display module using a first period for which the first display module 11 is exposed to the external light and a second period for which the second display module 12 is exposed to the external light. In addition, the electronic device 100 may identify the performance change of each display module using information regarding the intensity of the external light applied to each of the display modules 11 and 12. The electronic device 100 may display the guide information for requesting for the change of the positions of the display modules on the display 10 using the identified performance change of each display module.

FIG. 3 illustrates block diagrams illustrating schematic configurations of the electronic device according to an embodiment.

Referring to (a) of FIG. 3, the electronic device 100 may include a display 310, a processor 320, and a memory 330. However, the electronic device 100 may be implemented with a larger number of elements than the elements illustrated in the drawing and is not limited to the above example.

The display 310 may display image data. For example, the display 310 may display a video included in a broadcasting signal received from an external device under the control of the processor 320. The display 310 may include a plurality of display modules including the first display module 11 and the second display module 12. The display 310 according to an embodiment may display the guide information for requesting for the change of the positions of the first display module 11 and the second display module 12 under the control of the processor 320.

The processor 320 may be implemented in various combinations of one or more memories and one or more processors. For example, the memory 330 may generate and remove program modules according to the operation of the processor 320 and the processor 320 may process the operations of the program modules.

The processor 320 according to an embodiment may obtain the first data generated by the first display module 11 and the second data generated by the second display module 12. The first data and the second data may be, for example, luminance information.

The processor 320 may generate the guide information for requesting for the change of the positions of the first display module 11 and the second display module 12 using an average value (e.g., first average luminance) of the first data obtained by accumulating the first data (e.g., first luminance) for a set period and an average value (e.g., second average luminance) of the second data obtained by accumulating the second data (e.g., second luminance) for a set period, and control the display 310 to display the guide information.

The memory 330 may include at least one type of storage medium among a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The memory 330 according to an embodiment may store the first data generated by the first display module 11 and the second data generated by the second display module 12, obtain the average value of the first data obtained by accumulating the first data for a set period and the average value of the second data obtained by accumulating the second data for a set period, and store instructions set to control the display 310 to display the guide information for requesting for the change of the positions of the first display module and the second display module using the average value of the first data and the average value of the second data.

Referring to (b) of FIG. 3 and (c) of FIG. 3, the electronic device 100 may further include a decoder 340, a display buffer 350, and an image quality processor 360. However, there is no limitation thereto.

According to an embodiment, sub-buffers 311a and 312a and the sub-image quality processors 311b and 312b may perform the same or similar functions as those of the display buffer 350 and the image quality processor 360 on each of display modules 311 and 312.

The decoder 340 may perform decoding with respect to an image received from an external device or stored in the electronic device 100. The decoded image may be expressed with the YUV color space. The image decoded by the decoder 340 may be transmitted to the display buffer 350. According to the embodiments, each of the display modules 311 and 312 may further additionally include a decoder.

The display buffer 350 may store the image data for at least one screen and output the data as a bit string according to a signal. According to an embodiment, the image data stored in the display buffer 350 may be transmitted to the image quality processor 360.

The image quality processor 360 may perform image quality processing with respect to input image. For example, the image quality processor 360 may enhance a contrast ratio and colors of the input image to optimize color sense of the image. In addition, the image quality processor 360 may perform gamma correction with respect to the input image to optimize the image quality. Further, the image quality processor 360 may sharply process an edge part included in the image to enhance the definition of the image. Furthermore, the image quality processor 360 may adjust a resolution of an image or perform anti-aliasing to alleviate jagging appearing on the image.

Referring to (b) of FIG. 3, the electronic device 100 according to an embodiment may obtain the luminance information of each of the display modules 311 and 312 from the image data transmitted to each of the display modules 311 and 312 via the image quality processor 360. In other words, the electronic device 100 may divide the image data into image data areas respectively corresponding to the display modules 311 and 312 and obtain an average value of the luminance corresponding to each pixel in the divided image data area.

In addition, the electronic device 100 according to an embodiment may extract the luminance information of a plurality of display areas included in each of the display modules 311 and 312 from the image data transmitted to the display modules 311 and 312 via the image quality processor 360. In other words, the electronic device 100 may divide the image data into image data areas corresponding to the display modules 311 and 312, respectively, divide the divided image data area again into areas corresponding to a plurality of display areas, and obtain an average value of the luminance corresponding to each pixel in each area of the divided image data.

Referring to (3) of FIG. 3, the electronic device 100 according to an embodiment may obtain luminance information from image data buffered by the first sub-buffer 311a. In this case, the luminance information may refer to an average value of the luminance of the image data to be displayed on the first display module 311. In other words, the luminance information may be an average value of the luminance corresponding to each pixel of the first display module 311 in the image data buffered by the first sub-buffer 350-1.

In addition, the electronic device 100 according to an embodiment may obtain luminance information from the image data buffered by the second sub-buffer 312a. In this case, the luminance information may refer to an average value of the luminance of the image data displayed on the second display module 312. In other words, the luminance information may be an average value of the luminance corresponding to each pixel of the second display module 312 in the image data buffered by the second sub-buffer 312a.

The electronic device 100 according to an embodiment may divide the image data buffered by the first sub-buffer 311a into a plurality of areas and obtain the luminance information for each area. In this case, the luminance information may refer to an average value of the luminance of the image data to be displayed on the plurality of display areas included in the first display module 311. In other words, the luminance information may be an average value of the luminance corresponding to each pixel of the plurality of display areas included in the first display module 311 in the image data buffered by the first sub-buffer 311a.

The electronic device 100 according to an embodiment may divide the image data buffered by the second sub-buffer 312a into a plurality of areas and obtain luminance information for each area. In this case, the luminance information may refer to an average value of the luminance of the image data to be displayed on the plurality of display areas included in the second display module 312. In other words, the luminance information may be an average value of the luminance corresponding to each pixel of the plurality of display areas included in the second display module 312 in the image data buffered by the second sub-buffer 312a.

FIG. 4 illustrates views for explaining situations in which the electronic device displays the guide information for requesting for a change of positions of display areas using data generated by the display module according to an embodiment.

Referring to (a) of FIG. 4, the display 10 may include a plurality of display modules. For example, the display 10 may include 30 display modules including the first display module 11, the second display module 12, and a third display module 13.

According to an embodiment, the electronic device 100 may divide one display module into areas and obtain luminance information of pixels outputting light.

For example, the electronic device 100 may divide the area of the third display modules 13 into four areas. The electronic device 100 may divide the third display module 13 into a third-one display area 13-1, a third-two display area 13-2, a third-three display area 13-3, and a third-four display area 13-4.

According to an embodiment, the electronic device 100 may obtain and store luminance information (e.g., third-one luminance) from the third-one display area 13-1. The electronic device 100 may identify that third-one average luminance of the third-one display area 13-1 is 200 nits (nt) using the third-one luminance accumulated for a set period. The electronic device 100 may obtain and store the luminance information (e.g., third-two luminance) from the third-two display area 13-2. The electronic device 100 may identify that third-two average luminance of the third-two display area 13-2 is 300 nits (nt) using the third-two luminance accumulated for a set period. The electronic device 100 may obtain and store luminance information (e.g., third-three luminance) from the third-three display area 13-3. The electronic device 100 may identify that third-three average luminance of the third-three display area 13-3 is 300 nits (nt) using the third-three luminance accumulated for a set period. The electronic device 100 may obtain and store luminance information (e.g., third-four luminance) from the third-four display area 13-4. The electronic device 100 may identify that third-four average luminance of the third-four display area 13-4 is 400 nits (nt) using the third-four luminance accumulated for a set period.

The electronic device 100 may identify that the pixels included in the third-four display area 13-4 have output light with higher luminance than the pixels included in the third-one display area 13-1, by comparing the third-one average luminance and the third-one average luminance The output of light by the LED pixels with high luminance may imply, for example, that the electronic device 100 has applied a high current value to an LED pixel or increased light emission time. The output of light by the LED pixels with low luminance may imply, for example, that the light emission life for outputting light becomes shorter than that of the pixels outputting light with lower luminance.

According to an embodiment, the electronic device 100 may guide a user to change positions of the display areas to prevent a comparatively rapid decrease in life of some display areas among the display areas.

Referring to (b) of FIG. 4, the electronic device 100 may display guide information for requesting for a change of positions of the display areas on the display 10 using the data obtained from each display area.

According to an embodiment, the electronic device 100 may display the guide information for requesting for rotation of the third display module 13, so that the positions of the two display areas 13-1 and 13-4 are changed, on the display 10, if the third-one average luminance is different from the third-four average luminance by a set value or more (e.g., twice or more). But, a reference for displaying the guide information for requesting for the rotation of the display module to change the positions of the two display areas is not limited thereto. For example, the electronic device 100 may display the guide information for requesting for the rotation of the display module to change the positions of the two display areas 13-1 and 13-4, on the display 10, if the third-one average luminance is different from the third-four average luminance by 1.2 times, 1.5 times, or 1.8 times.

According to an embodiment, the electronic device 100 may display an edge of the third-one display area 13-1 and an edge of the third-four display area 13-4 to be changed, with a set color, as the guide information. According to the embodiments, the electronic device 100 may display a notification message of "Please rotate the selected display module" on the display 10 as a pop-up window.

According to the embodiments, the electronic device 100 may display the edge of the third-one display area 13-1 and the edge of the third-four display area 13-4 to be changed, with increased brightness as the guide information.

According to the embodiments, the electronic device 100 may display a first arrow 41 towards the third-four display area 13-4 from the third-one display area 13-1 and a second arrow 42 towards the third-one display area 13-1 from the third-four display area 13-4, to display the guide information for requesting for the change of the positions of the two display areas 13-1 and 13-4.

According to the embodiments, if the electronic device 100 is able to communicate with a wearable device or another electronic device, the electronic device 100 may transmit the guide information to the wearable device or the other electronic device to provide the guide information to a user.

However, the method for displaying the guide information for requesting for the rotation of the display module to change the positions of the display areas may not be limited thereto. The electronic device 100 may provide the guide information to the user using various methods.

Figure 5:
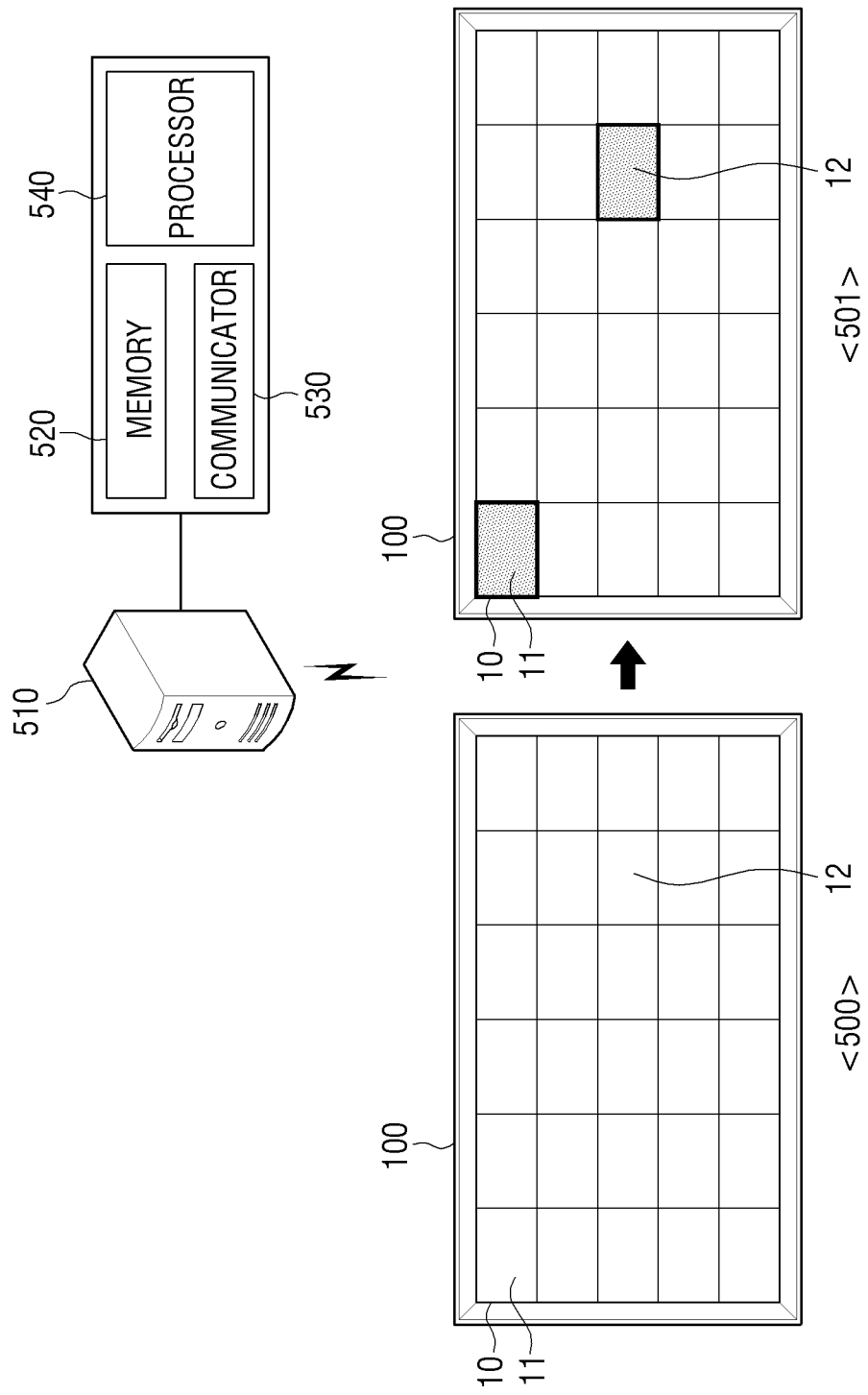
FIG. 5 illustrates views for explaining situations in which a server displays guide information for requesting for a change of positions of the display modules using data generated by the display module of the electronic device according to an embodiment.

FIG. 5 illustrates views for explaining situations in which a server displays guide information for requesting for a change of positions of the display modules using data generated by the display module of the electronic device according to an embodiment.

Referring to FIG. 5, the display 10 may include a plurality of display modules. For example, the display 10 may be formed to include 30 display modules including the first display module 11 and the second display module 12.

According to an embodiment, the electronic device 100 may establish the communication with a server 510.

According to the embodiments, the server 510 may include a processor 540, a memory 520, and a communicator 530. However, there is no limitation thereto.

The processor 540 may be implemented in various combinations of one or more memories and one or more processors. For example, the memory 520 may generate and remove program modules according to the operation of the processor 540 and the processor 540 may process the operations of the program modules.

The memory 520 may include at least one type of storage medium among a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The communicator 530 may connect the server 510 to an external device (e.g., the electronic device 100) under the control of the processor 540. The communicator 530 may include one of elements for realizing wireless LAN, Bluetooth, and wired Ethernet, according to the performance and structure of the electronic device 100.

According to an embodiment, when the first data generated by the first display module 11 and the second data generated by the second display module 12 are received from the external device (e.g., the electronic device 100), the server 510 may generate the guide information for requesting for the change of the positions of the first display module and the second display module using the first data and the second data and transmit the guide information to the external device.

According to an embodiment, the server 510 may receive information regarding luminance which is brightness of light output by the pixels, when the pixels included in each of display modules including the first display module 11 and the second display module 12 output light to display an image, from the electronic device 100. For example, the server 510 may obtain first luminance (e.g., first data) from the first display module 11 and receive second luminance (e.g., second data) from the second display module 12 from the electronic device 100.

According to an embodiment, the server 510 may accumulate the luminance obtained from the display modules for a preset period (e.g., 6 months, 1 year, or 2 years). The server 510 may obtain an average value of luminance (e.g., average luminance value) using the accumulated luminance obtained from each display module.

Referring to FIG. 5, in a state 500, the server 510 may obtain and store luminance information (e.g., first luminance) from the first display module 11. The server 510 may identify that the first average luminance of the first display module 11 is 200 nits (nt) using the first luminance accumulated for a set period. In addition, the server 510 may obtain and store luminance information (e.g., second luminance) from the second display module 12 for a set period. The server 510 may identify that the second average luminance of the second display module is 400 nits (nt) using the second luminance accumulated for a set period.

The server 510 may identify that the pixels included in the second display module 12 have output light with higher luminance than the pixels included in the first display module 11, by comparing the first average luminance and the second average luminance.

The output of light with high luminance by the LED pixels may imply, for example, that the electronic device 100 has applied a high current value to the LED pixel or increased the light emission time. If the LED pixels output light with high luminance, the light emission life for outputting light may be reduced compared to the pixels outputting light with low luminance.

According to an embodiment, the server 510 may transmit the guide information for guiding to change the positions of the display modules to the external device (e.g., the electronic device 100), to prevent comparatively rapid decrease in life of some display modules among the plurality of display modules.

In a state 501, the electronic device 100 may receive the guide information for requesting for the change of the positions of the display modules using the data obtained by the display modules from the server 510 and display the guide information on the display 10.

According to an embodiment, the server 510 may transmit the guide information for requesting for the change of the positions of the two display modules 11 and 12 to the external device (e.g., the electronic device 100), if the first average luminance is different from the second average luminance by a set value or more (e.g., twice or more). But, a reference for transmitting the guide information for requesting for the change of the positions of the two display modules is not limited thereto. For example, the server 510 may transmit the guide information for requesting for the change of the positions of the two display modules 11 and 12 to the external device (e.g., electronic device 100), if the first average luminance is different from the second average luminance by 1.2 times, 1.5 times, or 1.8 times.

According to an embodiment, the server 510 may generate the guide information for displaying the edge of the first display module 11 and the edge of the second display module to be changed, with a set color and transmit the guide information to the electronic device 100. In this case, the electronic device 100 may generate the guide information for displaying the first display module 11 and the second display module 12 to be changed in a translucent state and transmit the guide information to the electronic device 100. According to the embodiments, the server 510 may generate the guide information for displaying a notification message of "Please change positions of two display modules" on the display 10 as a pop-up window and transmit the guide information to the electronic device 100.

According to the embodiments, the server 510 may generate the guide information for displaying the edge of the first display module 11 and the edge of the second display module 12 to be changed with increased brightness and transmit the guide information to the electronic device 100.

According to the embodiments, the electronic device 100 may display an arrow towards the second display module 12 from the first display module 11 and an arrow towards the first display module 11 from the second display module 12, generate the guide information for requesting for the change of the positions of the two display modules 11 and 12, and transmit the guide information to the electronic device 100.

According to the embodiments, the server 510 may store unique number corresponding to each display module. The server 510 may match each unique number to the display module, display the unique numbers on the display, generate guide information for displaying a notification message of "Please change positions of No. 1 (e.g., first display module 11) and No. 17 (e.g., second display module 12)" as a pop-up window, and transmit the guide information to the electronic device 100.

According to the embodiments, if the server 510 is able to communicate with a wearable device or another electronic device corresponding to the electronic device 100, the server 510 may transmit the guide information to the wearable device or the other electronic device to provide the guide information to a user.

The method for providing the guide information for requesting for the change of the positions of the display modules may not be limited thereto. The server 510 may provide the guide information to the user using various methods.

According to the embodiments, the server 510 may receive, for example, the first average luminance obtained using the first luminance obtained from the first display module and the second average luminance obtained using the second luminance obtained from the second display module from the electronic device 100.

The server 510 may obtain third data including whether to change positions of the first display module and the second display module using the first average luminance and the second average luminance.

According to the embodiments, the server 510 may transmit the third data to the electronic device 100. The electronic device 100 may display the guide information for requesting for the change of the positions of the first display module 11 and the second display module 12 using the received third data.

According to the embodiments, the server 510 may use the highest brightness value among the luminance obtained by the display modules. For example, the server 510 may generate a function for applying the highest brightness value among the luminance obtained by the display modules to the average luminance According to the embodiments, the highest brightness value of the first luminance and the first average luminance may be input to the function and the two values may be calculated to obtain first calibration average luminance. In addition, the highest brightness value of the second luminance and the second average luminance may be input to the function and the two values may be calculated to obtain second calibration average luminance. The server 510 may generate the third data including whether to change the positions of the first display module and the second display module and transmit the third data to the electronic device 100, if the first calibration average luminance is different from the second calibration average luminance by a set value or more.

However, there is no limitation thereto, and the server 510 may generate the third data including whether to change the positions of the first display module and the second display module using the luminance obtained from the display modules by various methods, the luminance with the highest brightness, the average luminance, and the like.

FIG. 6 illustrates views for explaining situations in which the electronic device displays guide information related to display calibration using data generated from each display module according to an embodiment.

Referring to (a) of FIG. 6, the display 10 may include a plurality of display modules. For example, the display 10 may be formed to include 30 display modules including the first display module 11 and the second display module 12.

According to an embodiment, the electronic device 100 may obtain information regarding luminance which is brightness of light output by the pixels, when the pixels included in each of the display modules including the first display module 11 and the second display module 12 output light to display an image. For example, the electronic device 100 may obtain first luminance (e.g., first data) from the first display module 11 and obtain second luminance (e.g., second data) from the second display module 12.

The electronic device 100 according to an embodiment may accumulate the luminance obtained from the display modules for a preset period (e.g., 6 months, 1 year, or 2 years). The electronic device 100 may obtain an average value of the luminance (e.g., average luminance) using the accumulated luminance obtained from each display module.

For example, referring to (a) of FIG. 6, the electronic device 100 may obtain and store luminance information (e.g., first luminance) from the first display module 11. The electronic device 100 may identify that first average luminance of the first display module 11 is 100 nits (nt) using the first luminance accumulated for a set period. In addition, the electronic device 100 may obtain and store luminance information (e.g., second luminance) from the second display module 12. The electronic device 100 may identify that second average luminance of the second display module 12 is 200 nits (nt) using the second luminance accumulated for a set period.

The electronic device 100 may identify that the pixels included in the second display module 12 have output light with luminance higher than that of the pixels included in the first display module 11 by comparing the first average luminance and the second average luminance.

The output of light with high luminance by the LED pixels may imply, for example, that the electronic device 100 has applied a high current value to the LED pixel or increased light emission time. If the LED pixels output light with high luminance, the light emission life for outputting light may be reduced compared to the pixels outputting light with low luminance.

According to an embodiment, the electronic device 100 may perform display calibration to prevent comparatively rapid decrease in life of some display modules among the plurality of display modules.

Referring to (b) of FIG. 6, the electronic device 100 may display guide information for calibrating the display using the data obtained by the display module on the display 10.

According to an embodiment, the electronic device 100 may display guide information 610 for notifying a display calibration progress on the display 10, if the first average luminance is different from the second average luminance by a set value or more (e.g., twice or more). But, a reference for displaying the guide information for notifying for the display calibration progress is not limited thereto. For example, the electronic device 100 may display the guide information for notifying for the display calibration progress on the display 10, if the first average luminance is different from the second average luminance by 1.2 times, 1.5 times, or 1.8 times.

Figure 7:
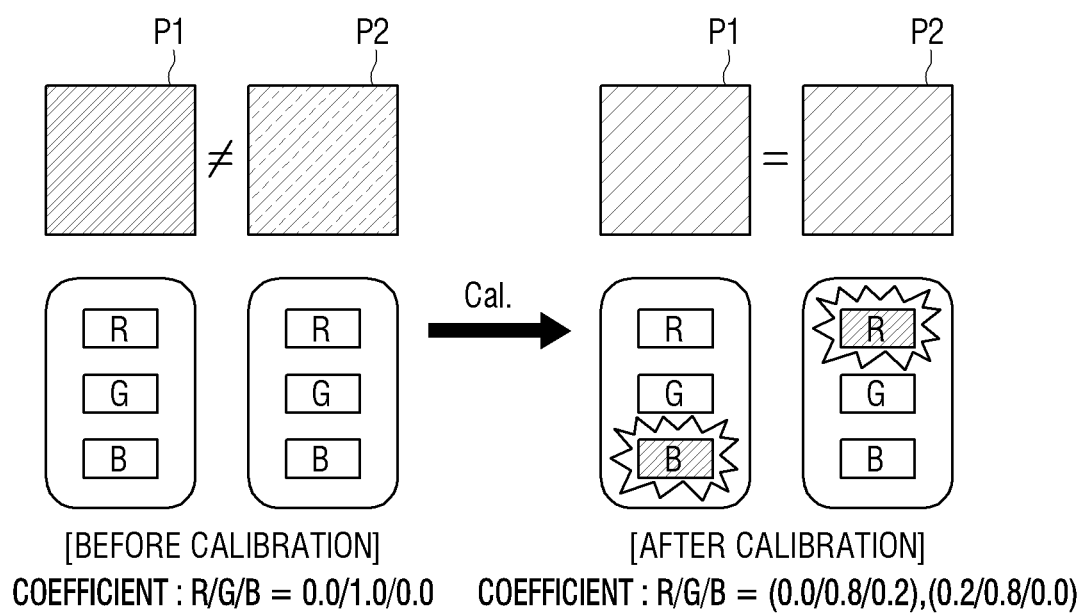
FIG. 7 illustrates a view for explaining a display calibration method according to an embodiment.

FIG. 7 illustrates a view for explaining a display calibration method according to an embodiment.

Referring to FIG. 7, two pixels P1 and P2 of the display 10 before calibration may output green light by applying R/G/B coefficients of 0.0/1.0/0.0. But, as described above, the two pixels P1 and P2 of the display 10 may output green light with different chromaticity according to the difference in average luminance of the pixels.

When the calibration is performed with respect to the two pixels P1 and P2 of the display 10, the pixel P1 may increase a coefficient value of a green (G) sub-pixel to reduce the chromaticity of green and the pixel P2 may increase a coefficient value of a red (R) sub-pixel to increase chromaticity of green.

In other words, after the calibration is performed, calibration coefficient values of R/G/B of the pixel P1 may be 0.0/0.8/0.2 and calibration coefficient values of R/G/B of the pixel P2 may be 0.2/0.8/0.0.

As described above, the electronic device 100 may calibrate the display 10 by changing the calibration coefficient values of the pixels.

According to the embodiments, the electronic device 100 may change a bandwidth of a color included in the image and transmit the image to a panel. For example, the electronic device 100 may change a bandwidth of a color transmitted to a pixel that is necessary to change the calibration coefficient value, with respect to the image to be transmitted to the panel. The electronic device 100 may have the same or similar effect as in a case of changing the calibration coefficient value by using the method described above.

Figure 8:
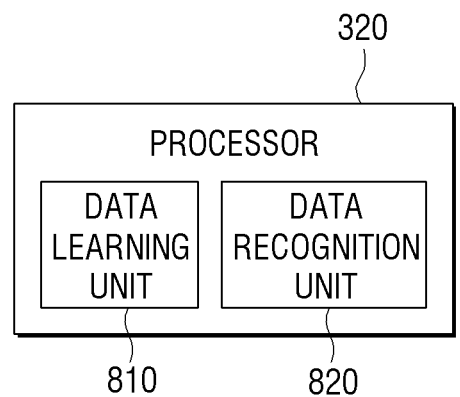
FIG. 8 illustrates a block diagram of a processor according to an embodiment.

FIG. 8 illustrates a block diagram of the processor according to an embodiment.

Referring to FIG. 8, the processor 320 according to the embodiment may include a data learning unit 810 and a data recognition unit 820.

The data learning unit 810 may train a data recognition model to have a reference to predict whether to change the positions of the first display module and the second display module. The data learning unit 810 may train the data recognition model to have a reference regarding which learning data is to be used to predict whether to change the positions of the display modules, and a reference regarding how to predict whether to change the positions of the display modules using the learning data. The data learning unit 810 may train the data recognition model using the first average luminance obtained using the first luminance generated by the first display module, the second average luminance obtained using the second luminance generated by the second display module, and the third data including whether to change the positions of the display modules as the learning data.

For example, the learning data may be the first average luminance of 200 nits, the second average luminance of 400 nits, and a state of requesting for the change of positions. According to the embodiments, the learning data may be the first average luminance of 150 nits, the second average luminance of 200 nits, and a state of not requesting for the change of positions. In addition, according to the embodiments, the learning data may be the first average luminance of 100 nits, the second average luminance of 150 nits, and a state of requesting for the change of positions.

As described above, the data learning unit 810 may train the data recognition model using the first average luminance, the second average luminance, and the third data including whether to change the positions of the display modules according to the first average luminance and the second average luminance, as the learning data.

According to an embodiment, the data recognition model may be formed of one data recognition model or may be formed of an assembly of a plurality of data recognition models.

The data recognition unit 820 may predict whether to change the positions of the first display module and the second display module based on various types of data for recognition. The data recognition unit 820 may obtain the third data including whether to change the positions of the display modules based on the first average luminance obtained using the first luminance generated by the first display module and the second average luminance obtained using the second luminance generated by the second display module using the trained data recognition model.

According to an embodiment, the data recognition unit 820 may use a result of obtaining the third data including whether to change the positions of the display modules and a response of a user to the obtained result, for updating the data recognition model, by setting the input first average luminance and second average luminance as input values of the data recognition model.

For example, if the first average luminance of 130 nits generated by the first display module and the second average luminance of 200 nits generated by the second display module are input, the data recognition unit 820 may obtain the third data including to change the positions of the first display module and the second display module. For example, if the first average luminance of 50 nits generated by the first display module and the second average luminance of 70 nits generated by the second display module are input, the data recognition unit 820 may obtain the third data including not to change the positions of the first display module and the second display module.

As described above, the data recognition unit 820 may obtain the third data including whether to change the positions of the display modules in response to the various values of the first average luminance and the second average luminance The data recognition model may be constructed by considering applied fields of the recognition model, the purpose of learning, computer performance of the device, or the like. The data recognition model may be a model based on a neural network, for example. The data recognition model may be designed to simulate a brain structure of human on a computer. The data recognition model may include a plurality of network nodes including weights and simulating neurons of the neural network of human. The plurality of network nodes may form connections to each other to simulate a synaptic activity in that the neurons transmit and receive signals through synapse. The data recognition model may include, for example, a neural network model or a deep learning model developed from the neural network model. In a deep learning model, a plurality of network nodes may be positioned at depths (or on layers) different from each other and may transmit and receive data according to the convolution connection. For example, data recognition model such as a deep neural network (DNN), a recurrent neural network (RNN), and a bidirectional recurrent deep neural network (BRDNN) may be used, but there is no limitation thereto.

At least one of the data learning unit 810 and the data recognition unit 820 may be manufactured in a form of at least one hardware chip and mounted on the electronic device. For example, at least one of the data learning unit 810 and the data recognition unit 820 may be manufactured in a form of a dedicated hardware chip for artificial intelligence (AI) and may be manufactured as a part of the conventional generic-purpose processor (e.g., CPU or application processor) or a graphic dedicated processor (e.g., GPU) and mounted on various electronic devices described above.

According to an embodiment, the dedicated hardware chip for artificial intelligence is a dedicated processor specialized in probability calculation and may rapidly process the calculation operations in the artificial intelligence field such as machine learning with higher performance of parallel processing than the conventional generic-purpose processor.

The data learning unit 810 and the data recognition unit 820 may be mounted on one electronic device or may be mounted on separate electronic devices, respectively. For example, one of the data learning unit 810 and the data recognition unit 820 may be included in an electronic device and the other one thereof may be included in a server. In addition, the data learning unit 810 and the data recognition unit 820 are communicated with each other in a wired or wireless manner so that the data learning unit 810 may provide constructed model information to the data recognition unit 820 and the data input to the data recognition unit 820 may be provided to the data learning unit 810 as additional learning data.

At least one of the data learning unit 810 and the data recognition unit 820 may be implemented as a software module. If at least one of the data learning unit 810 and the data recognition unit 820 is implemented as a software module (or program module including instructions), the software module may be stored in non-transitory computer readable media. In addition, in this case, at least one software module may be provided by the operating system (OS) or provided by a predetermined application. Alternatively, a part of the at least one software module may be provided by the operating system (OS) and the other part thereof may be provided by a predetermined application.

Figure 9:
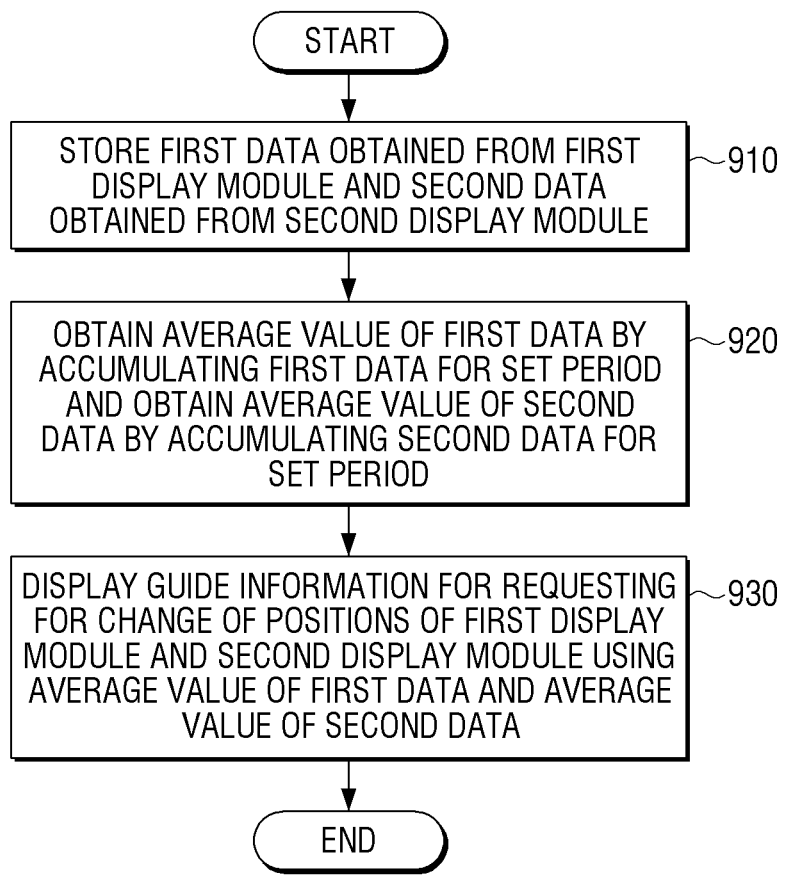
FIG. 9 illustrates a flowchart for explaining a situation in which the electronic device displays guide information for requesting for a change of positions of the display modules using data generated by each display module according to an embodiment.

FIG. 9 illustrates a flowchart for explaining a situation in which the electronic device displays guide information for requesting for a change of positions of the display modules using data generated by each display module according to an embodiment.

Referring to Step 910, the electronic device 100 may store the first data obtained from the first display module and the second data obtained from the second display module.

According to an embodiment, the electronic device 100 may obtain the first luminance (e.g., first data) from the first display module 11 and obtain the second luminance (e.g., second data) from the second display module 12 and store these.

Referring to Step 920, the electronic device 100 may obtain an average value of the first data by accumulating the first data for a set period and obtain an average value of the second data by accumulating the second data for a set period.

According to an embodiment, the electronic device 100 may accumulate the luminance obtained from each display module for a preset period (e.g., 3 months, 6 months, 1 year, or 2 years). The electronic device 100 may obtain an average value of luminance (e.g., average luminance) using the accumulated luminance obtained from each display module.

The electronic device 100 may identify that the pixels included in the second display module 12 have output light with luminance higher than that of the pixels included in the first display module 11 by comparing the first average luminance obtained using the data obtained from the first display module 11 and the second average luminance obtained using the data obtained from the second display module 12. The electronic device 100 may identify that the life of the pixels included in the second display module 12 becomes shorter than the life of the pixels included in the first display module 11 using the first average luminance and the second average luminance.

Referring to Step 930, the electronic device 100 may display guide information for requesting for a change of positions of the first display module and the second display module using the average value of the first data and the average value of the second data.

According to an embodiment, the electronic device 100 may display the guide information for requesting for a change of the positions of the two display modules 11 and 12 on the display 10, if the first average luminance obtained using the data obtained from the first display module 11 is different from the second average luminance obtained using the data obtained from the second display module 12 by a set value (e.g., twice or more). But, a reference for displaying the guide information for requesting for the change of the positions of the two display modules is not limited thereto. For example, the electronic device 100 may display the guide information for requesting for the change of the positions of the two display modules 11 and 12 on the display 10, if the average luminance of the first display module 11 is different from the average luminance of the second display module 12 by 1.2 times, 1.5 times, or 1.8 times.

Figure 10:
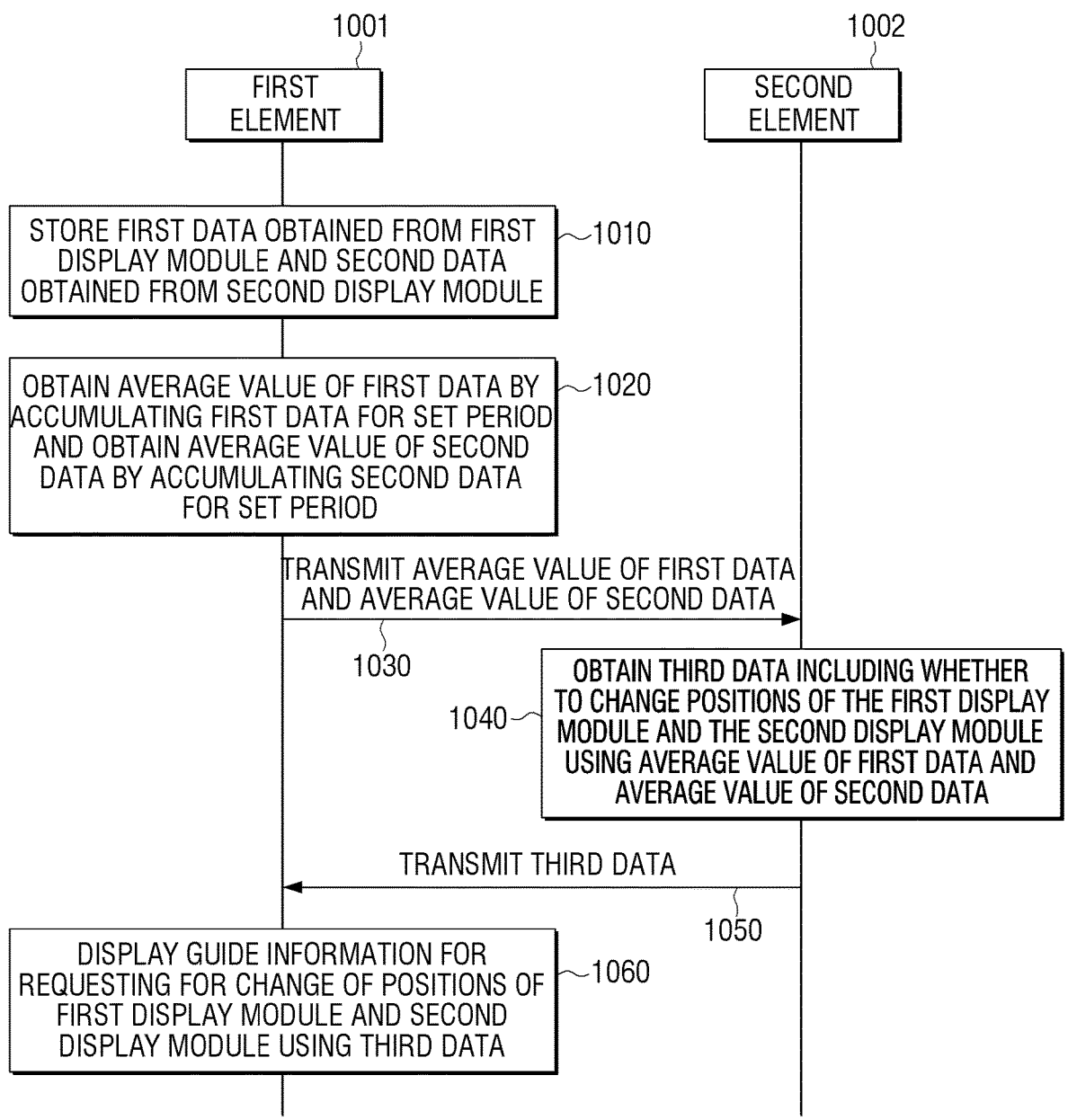
FIG. 10 illustrates a flowchart for explaining a situation using a data recognition model according to an embodiment.

FIG. 10 illustrates a flowchart for explaining a situation using a data recognition model according to an embodiment.

In FIG. 10, a first element 1001 may be the electronic device 100 and a second element 1002 may be a server (e.g., server 510 of FIG. 5) storing a data recognition model. In addition, the first element 1001 may be a generic-purpose processor and the second element 1002 may be an artificial intelligence dedicated processor. Further, the first element 1001 may be at least one application and the second element 1002 may be the operating system (OS).

In other words, the second element 1002 may be an element that is more integrated or specialized, or has less delay, improved performance, or a larger amount of resources than the first element 1001. In addition, the second element 1002 may be an element which is able to more effectively and rapidly process a large amount of processes required when generating, updating, or applying the data recognition model, compared to the first element 1001. According to the embodiments, a third element (not shown) performing a similar function as the second element 1002 may be added.

In this case, an interface for transmitting and receiving data between the first element 1001 and the second element 1002 may be defined.

For example, an application program interface (API) including the learning data to be applied to the data recognition model as a factor value (or medium value or transfer value) may be defined. The API may be defined as an assembly of sub-routines or functions which may be invoked from any one protocol (e.g., protocol defined on the electronic device 100) for certain processing of another protocol (e.g., protocol defined on the server (e.g., server 510 of FIG. 5)). In other words, an environment in which the operation of the other protocol is able to be performed on any one protocol may be provided through the API.

Referring to Step 1010, the first element 1001 may obtain the first data generated by the first display module and the second data generated by the second display module.

According to an embodiment, the electronic device 100 may obtain the first data obtained from the first display module 11 and store the second luminance obtained from the second display module 12.

Referring to Step 1020, the first element 1001 may obtain an average value of the first data by accumulating the first data for a set period (e.g., 3 months, 6 months, 1 year, or 2 years) and obtain an average value of the second data by accumulating the second data for a set period.

Referring to Step 1030, the first element 1001 may transmit the average value of the first data and the average value of the second data to the second element 1002.

Referring to Step 1040, the second element 1002 may obtain the third data including whether to change the positions of the first display module and the second display module using the average value of the first data and the average value of the second data.

According to an embodiment, the data recognition unit (e.g., data recognition unit 820 of FIG. 8) included in the second element 1002 may obtain the third data including whether to change the positions of the first display module and the second display module using the average value of the first data and the average value of the second data.

Referring to Step 1050, the second element 1002 may transmit the third data to the first element 1001.

Referring to Step 1060, the first element 1001 may display the guide information for requesting for the change of the positions of the first display module and the second display module using the third data.

Figure 11:
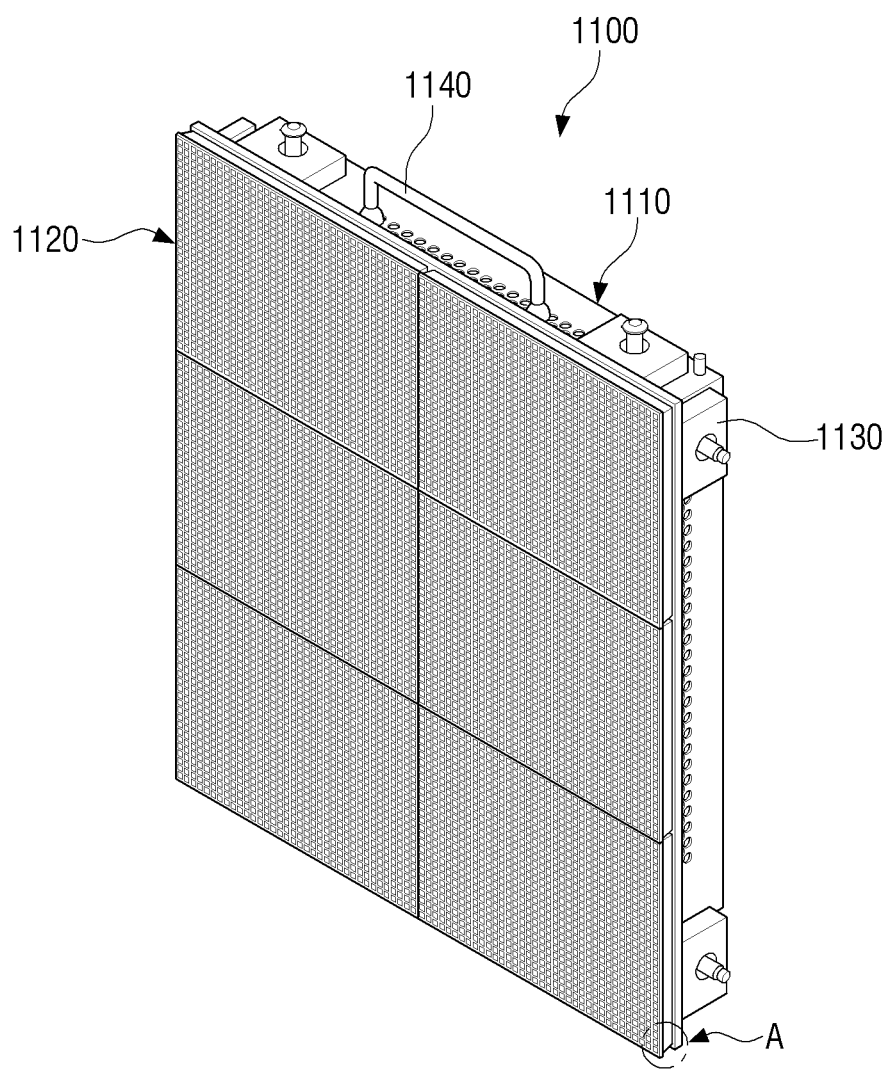
FIG. 11 illustrates a perspective view of a display module included in the electronic device according to an embodiment.
Figure 12:
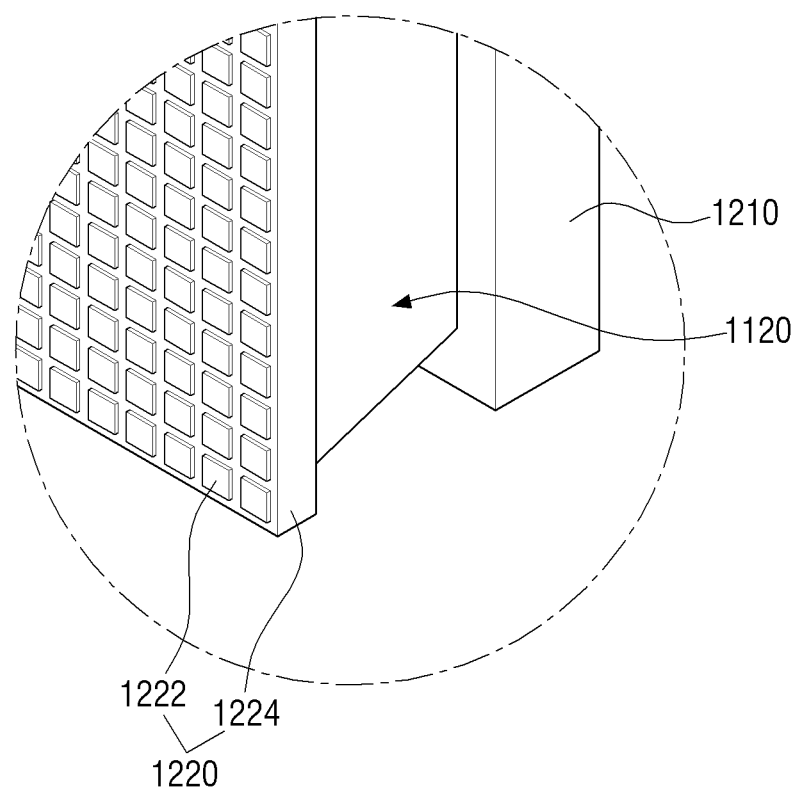
FIG. 12 illustrates an enlarged view of a part A of FIG. 11.
Figure 13:
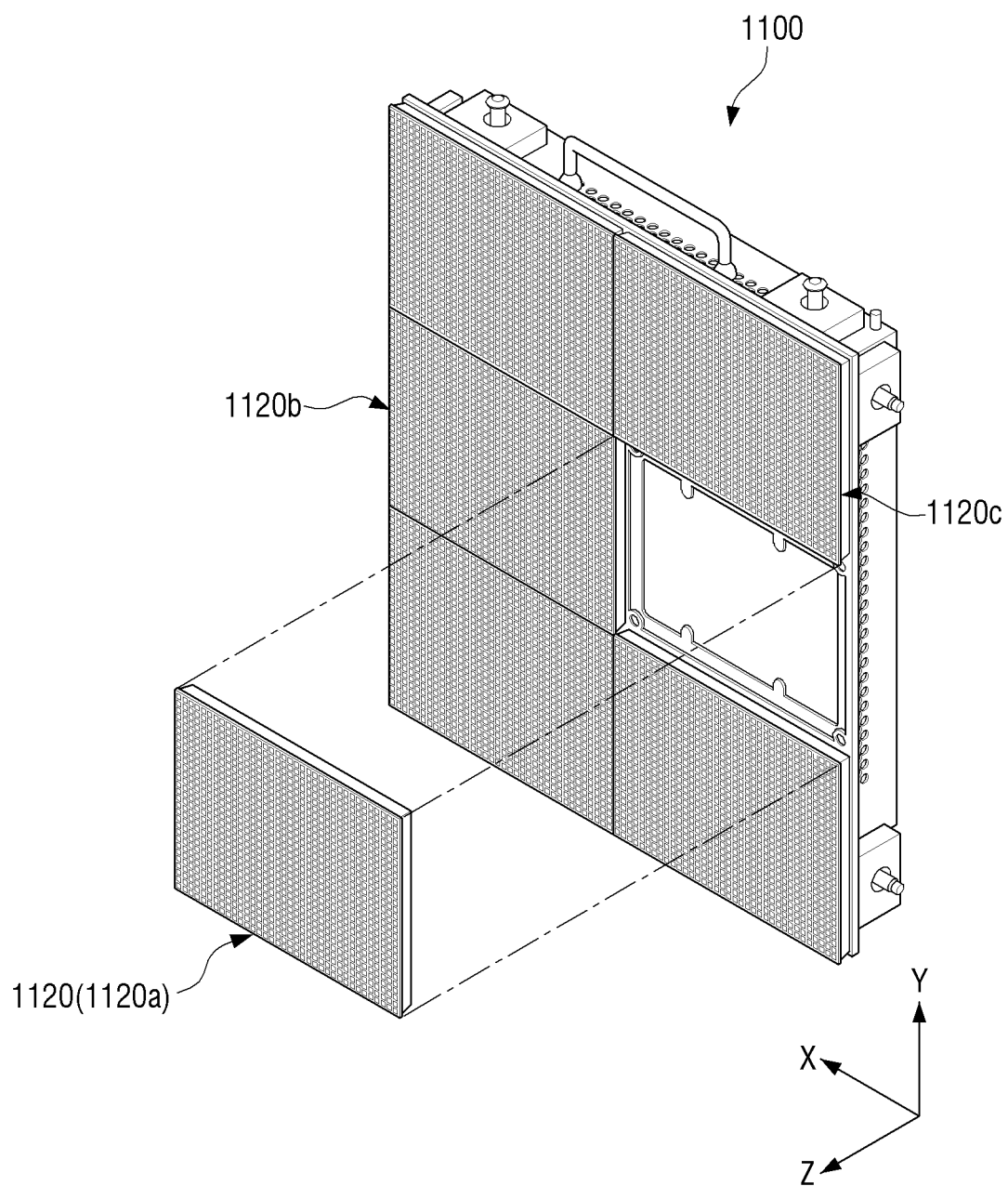
FIG. 13 illustrates a partially exploded perspective view of the display module according to an embodiment.

FIG. 11 illustrates a perspective view of a display module included in the electronic device according to an embodiment, FIG. 12 illustrates an enlarged view of a part A of FIG. 11, and FIG. 13 illustrates a partially exploded perspective view of the display module according to an embodiment.

A display module 1100 may include a cabinet 1110, and a plurality of LED modules 1120 disposed on the cabinet 1110. The display module 1100 may include the first display module 11 and the second display module 12 of FIG. 1, and the third display module 13 of FIG. 4.

The cabinet 1110 may include a connector 1130 capable of connecting the display module 1100 to another display module. The cabinet 1110 may include a handle 1140 so that the display module 1100 is easily moved. The handle 1140 may be rotated and stored so that the handle 1140 is not protruded to the outside of the display module 1100, when the display module 1100 is connected to another display module.

The cabinet 1110 may include a plurality of front brackets 1210 on which the plurality of LED modules 1120 are to be mounted. The plurality of LED modules 1120 may be disposed on the corresponding number of front brackets 1210. The LED module 1120 may include a LED panel 1220. The LED panel 1220 may include an LED substrate 1224 on which a plurality of LEDs 1222 are arranged.

The plurality of LED modules 1120 may include a first LED module 1120a and a second LED module 1120b arranged in a first direction (e.g., X direction) with respect to the first LED module 1120a. In addition, the plurality of LED modules 1120 may include a third LED module 1120c arranged in a second direction (e.g., Y direction) with respect to the first LED module 1120a. The first direction and the second direction may be a horizontal direction a vertical direction, respectively. The LED modules 1120 arranged in 2×3 have been described with reference to FIGS. 11 to 13, but the number and arrangement of the LED modules included in one display module are not limited thereto. In other words, the display module 1100 may be formed of one LED module or may have various forms such as the LED modules arranged in 2×2.

As described above, the display module 1100 included in the electronic device 100 according to an embodiment may be divided by a user. Accordingly, it is easy to realize the display 10 having a size desired by a user or to change the positions of the display modules.

Figure 14:
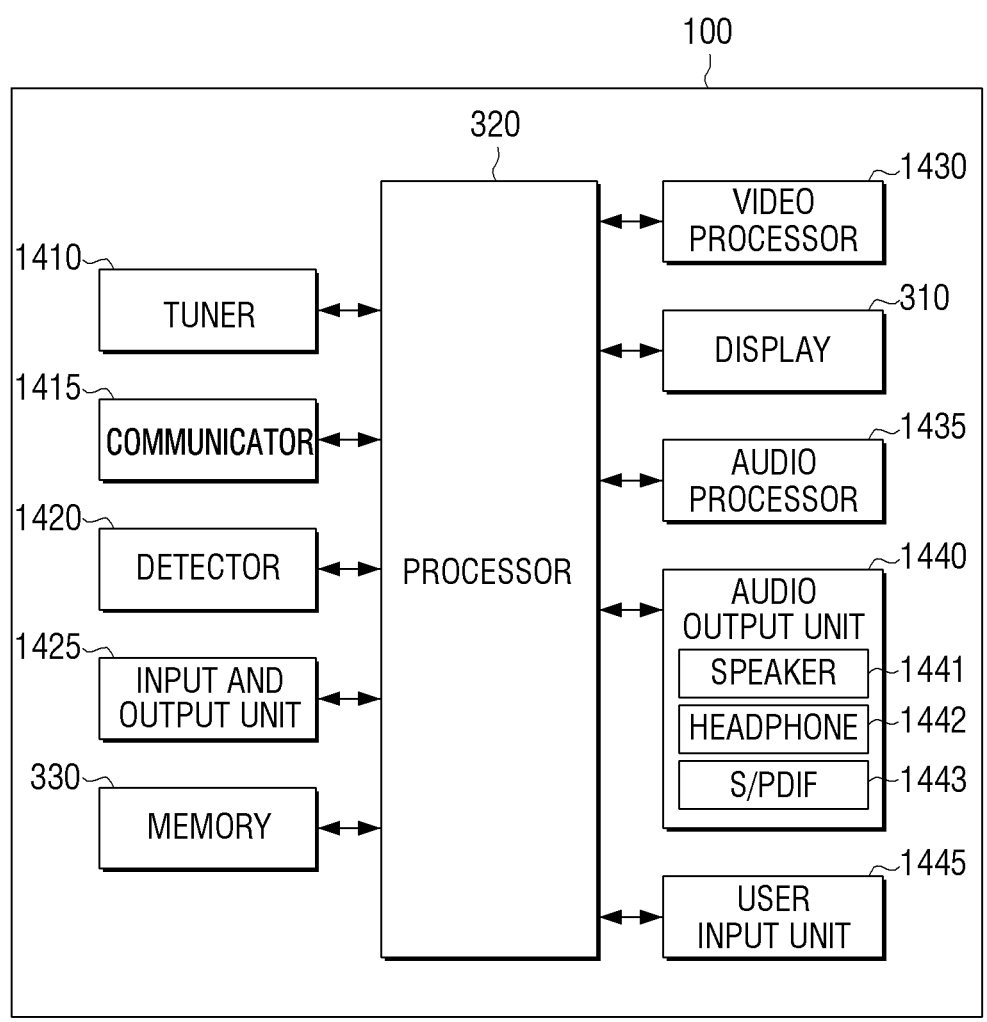
FIG. 14 illustrates a block diagram illustrating a configuration of an image display device according to an embodiment.

FIG. 14 illustrates a block diagram illustrating a configuration of the electronic device according to another embodiment.

As illustrated in FIG. 14, the electronic device 100 may further include a tuner 1410, a communicator 1415, a detector 1420, an input and output unit 1425, a video processor 1430, an audio processor 1435, an audio output unit 1440, and a user input unit 1445, in addition to the processor 320, the display 310, and the memory 330. The description of the processor 320, the display 310, and the memory 330 which is the same as the description in FIG. 3 will not be repeated in FIG. 14.

The tuner 1410 may tune and select only a frequency of a channel to be received by the electronic device 100 among a plurality of radio wave components through amplification, mixing, and resonance of a broadcast signal received in a wired or wireless manner. The broadcast signal may include sounds, videos, and additional information (e.g., electronic program guide (EPG)).

The tuner 1410 may receive a broadcast signal in a frequency band corresponding to the channel number according to user input.

The tuner 1410 may receive a broadcast signal from various sources such as ground-wave broadcasting, cable broadcasting, satellite broadcasting, Internet broadcasting, and the like. The tuner 1410 may also receive a broadcast signal from a source such as analog broadcasting or digital broadcasting. The broadcast signal received through the tuner 1410 may be separated into the sound, the video, and/or the additional information by decoding (e.g., audio decoding, video decoding, or additional information decoding). The separated audio, video, and/or additional information may be stored in the memory 330 under the control of the processor 320.

The number of tuners 1410 of the electronic device 100 may be one or more. The tuner 1410 may be implemented as a component of the all-in-one electronic device 100, or may be implemented as a separate device (for example, set-top box (not illustrated)) including a tuner electrically connected to the electronic device 100 or a tuner (not illustrated) connected to the input and output unit 1425.

The communicator 1415 may connect the electronic device 100 to an external device (e.g., audio device or the like) under the control of the processor 320. The processor 320 may transmit and receive contents to and from an external device connected via the communicator 1415, download an application from the external device, or browse web sites. The communicator 1415 may include one of a wireless LAN, Bluetooth, and wired Ethernet according to the performance and the structure of the electronic device 100.

In addition, the communicator 1415 may include a combination of wireless LAN, Bluetooth, and wired Ethernet. The communicator 1415 may receive a control signal of a control device (e.g., remote controller or smartphone) under the control of the processor 320. The control signal may be implemented as a Bluetooth type, an RF signal type, or a Wi-Fi type. The communicator 1415 may further include local area network other than Bluetooth (e.g., near field communication (NFC), not illustrated), and Bluetooth low energy (BLE, not illustrated).

The detector 1420 may detect a user's voice, a user's image, or a user's interaction and include a microphone, a camera, and an optical receiver.

The microphone may receive a voice uttered by a user. The microphone may convert the received voice into an electric signal and output the electric signal to the processor 320. The user's voice may include, for example, a voice corresponding to menu or function of the electronic device 100.

The camera may receive an image (e.g., continuous frame) corresponding to a user's motion including a gesture within a camera recognition range. The processor 320 may select the menu displayed on the electronic device 100 using a recognition result of the received motion or perform the control corresponding to the motion recognition result. Examples thereof may include channel adjustment, volume adjustment, indicator movement, and curser movement.

The optical receiver may receive an optical signal (including control signal) received from an external control device via a light window (not illustrated) of a bezel of the display 310. The optical receiver may receive an optical signal corresponding to a user input (e.g., touch, press, touch gesture, speech, or motion) from a control device. A control signal may be extracted from the received optical signal under the control of the processor 320.

The input and output unit 1425 may receive videos (e.g., moving image and the like), sounds (e.g., speech, music, and the like), and additional information (e.g., EPG and the like) from the outside of the electronic device 100 under the control of the processor 320. The input and output unit 1425 may include one of a High-Definition Multimedia Interface port (HDMI port), a component jack, a PC port, and a USB port. The input and output unit 1425 may include a combination of the HDMI port, the component jack, the PC port, and the USB port.

The processor 320 may control general operations of the electronic device 100 and signal flows between the internal elements of the electronic device 100 and perform the function of processing data. If a user input is obtained or predetermined and stored conditions are satisfied, the processor 320 may execute the operating system (OS) and various applications stored in the memory 330.

The video processor 1430 may process image data to be displayed on the display 310 and execute various image processing such as decoding, rendering, scaling, noise filtering, frame rate conversion, resolution conversion, and the like with respect to the image data.

The display 310 may display the image data processed by the video processor 1430. The display 310 may display a video included in the broadcast signal received through the tuner 1410 under the control of the processor 320. In addition, the display 310 may display a content (e.g., video) input via the communicator 1415 or the input and output unit 1425. The display 310 may output an image stored in the memory 330 under the control of the processor 320. In addition, the display 310 may display a voice user interface (UI, for example, including a voice command guide) for executing a voice recognition task corresponding to the voice recognition or a motion UI (for example, including a user motion guide for motion recognition) for executing a motion recognition task corresponding to the motion recognition.

If the display 310 is implemented as a touch screen, the display 310 may be used as an input device other than the output device. The display 310 may include at least one of a liquid crystal display, a thin film transistor-liquid crystal display, an organic light-emitting diode, a flexible display, a 3D display, and an electrophoretic display.

In addition, according to the implemented form of the electronic device 100, the electronic device 100 may include two or more displays 310.

The audio processor 1435 may perform processing with respect to audio data. The audio processor 1435 may execute various processing such as decoding, amplification, noise filtering, and the like with respect to the audio data. The audio processor 1435 may include a plurality of audio processing modules for processing the sounds corresponding to a plurality of contents.

The audio output unit 1440 may output sounds included in the broadcast signal received through the tuner 1410 under the control of the processor 320. The audio output unit 1440 may output the input sounds (e.g., voice, sound) input via the communicator 1415 or the input and output unit 1425. In addition, the audio output unit 1440 may output sounds stored in the memory 330 under the control of the processor 320. The audio output unit 1440 may include at least one of the speaker 1441, the headphone output terminal 1442, or Sony/Philips Digital Interface (S/PDIF) output terminal 1443. The audio output unit 1440 may include a combination of the speaker 1441, the headphone output terminal 1442, and the S/PDIF output terminal 1443.

The user input unit 1445 may refer to means for user to input data for controlling the electronic device 100. For example, the user input unit 1445 may include a key pad, a dome switch, a touch pad (contact capacitive type, pressure resistive type, infrared detection type, surface ultrasonic conduction type, integral tension measurement type, piezo effect type, or the like), a jog wheel, a job switch, and the like, but there is no limitation thereto.

For example, the user input may include input for moving a position of focus, input for selecting an application that is focused, or the like. If the user input unit 1445 is formed of a key pad or a dome switch, the user input for moving the position of the focus may be input of clicking or pressing a key corresponding to a specific direction. In addition, if the user input unit 1445 is formed of a touch pad, the user input may be input of touching a key corresponding to a specific direction, but is not limited to the example described above.

In this disclosure, the term "module" may include a unit implemented with hardware, software, or firmware and may be interchangeably used with terms, for example, logic, logic blocks, parts, or circuits. The "module" may be a component integrally formed or a minimum unit or a part of the component performing one or more functions. For example, according to an embodiment, the module may be implemented as an application-specific integrated circuit (ASIC).

Various embodiments of the disclosure may be implemented as software including one or more instructions stored in a storage medium (e.g., memory 330) readable by a machine (e.g., electronic device 100). For example, a processor (e.g., processor 320) of the machine (e.g., electronic device 100) may invoke at least one instruction among one or more stored instructions from the storage medium and execute it. This enables at least one function to be performed and operated according to the at least one invoked instruction. The one or more instructions may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product may be at least temporarily stored or temporarily generated in a storage medium such as a memory of a server of a manufacturer, a server of an application store, or a relay server.

According to the embodiments, each element (e.g., a module or a program) of the above-mentioned elements may include a single entity or a plurality of entities. According to the embodiments, one or more elements of the elements described above or operations thereof may be omitted, or one or more other elements or operations may added. Alternatively or additionally, a plurality of elements (e.g., modules or programs) may be integrated into one element. In this case, the integrated element may perform one or more functions of each element of the plurality of elements in the same or similar manner, as performed by the elements of the plurality of elements prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:
1. An electronic device comprising:
a display comprising a first display module and a second display module;
a processor; and
a memory,
wherein the memory stores instructions for configuring the processor to:

store first data obtained from the first display module and second data obtained from the second display module;

obtain an average value of the first data by accumulating the first data for a first set period and obtain an average value of the second data by accumulating the second data for a second set period, and control the display to display guide information requesting a change of positions of the first display module and the second display module, using the average value of the first data and the average value of the second data.

2. The device according to claim 1, wherein the first data comprises first luminance data obtained from the first display module and the second data comprises second luminance data obtained from the second display module.

3. The device according to claim 2, wherein the memory stores instructions for configuring the processor to obtain third data including whether to change the positions of the display modules by applying first average luminance obtained by accumulating the first luminance for a set period and second average luminance obtained by accumulating the second luminance for a set period to a data recognition model, and wherein the data recognition model is trained using the first average luminance, the second average luminance, and the third data according to the first average luminance and the second average luminance as learning data, and set to obtain the third data including whether to change the positions of the display modules using the average luminance.

4. The device according to claim 2, wherein the memory stores instructions for configuring the processor to control the display to display the guide information, based on first average luminance, obtained by accumulating the first luminance data obtained from the first display module for the first set period, being different from second average luminance, obtained by accumulating the second luminance obtained from the second display module for the second set period, by a set value or more.

5. The device according to claim 4, wherein the memory stores instructions for configuring the processor to display the guide information, based on first calibration average luminance, obtained using a maximum value of the first luminance data and the first average luminance, being different from second calibration average luminance, obtained using a maximum value of the second luminance data and the second average luminance, by a set value or more.

6. The device according to claim 1, wherein the guide information is indicated by displaying a set color on an edge of the first display module and an edge of the second display module.

7. The device according to claim 1, further comprising:
a communicator comprising a communication circuit,
wherein the memory stores instructions for configuring the processor control the communicator to transmit the guide information to an external device.

8. The device according to claim 1, wherein the memory stores instructions for configuring the processor to change at least one of a calibration coefficient value of pixels included in the first display module or a calibration coefficient value of pixels included in the second display module, using the average value of the first data and the average value of the second data.

9. An electronic device comprising:
a display comprising a first display module and a second display module;
a communicator, comprising a communication circuit, for communicating with an external device;
a processor; and
a memory,
wherein the memory stores instructions for configuring the processor to:
store first data obtained from the first display module and second data obtained from the second display module;
control the communicator to transmit an average value of the first data obtained by accumulating the first data for a set period and an average value of the second data obtained by accumulating the second data for a set period to an external device and receive third data including whether to change positions of the first display module and the second display module obtained by the external device; and
display guide information requesting a change of positions of the first display module and the second display module, using the third data,
wherein the third data is obtained using the average value of the first data and the average value of the second data.

10. A server comprising:
a communicator comprising a communication circuit;
a processor; and
a memory,
wherein the memory stores instructions for configuring the processor to:
receive an average value of first data obtained by using the first data obtained from a first display module and an average value of second data obtained using the second data obtained from a second display module, via the communicator;
obtain third data including whether to change positions of the first display module and the second display module, using the average value of the first data and the average value of the second data; and
control the communicator to transmit the third data to an external device.

11. A method for controlling an electronic device, the method comprising:
storing first data obtained from a first display module and second data obtained from a second display module;
obtaining an average value of the first data by accumulating the first data for a set period and obtaining an average value of the second data by accumulating the second data for a set period; and
displaying guide information requesting a change of positions of the first display module and the second display module, using the average value of the first data and the average value of the second data.

12. The method according to claim 11, wherein the first data comprises first luminance data obtained from the first display module and the second data comprises second luminance data obtained from the second display module.

13. The method according to claim 12, further comprising:
displaying the guide information, based on first average luminance, obtained by accumulating the first luminance obtained from the first display module for a first set period, being different from second average luminance, obtained by accumulating the second luminance obtained from the second display module for a second set period, by a set value or more.

14. The method according to claim 11, wherein the guide information is indicated by displaying a set color on an edge of the first display module and an edge of the second display module.

15. The method according to claim 11, further comprising:
transmitting the guide information to an external device.

* * * * *